(12) United States Patent
Hamasni et al.

(10) Patent No.: US 11,153,096 B2
(45) Date of Patent: Oct. 19, 2021

(54) PLATFORM FOR GENERATING AUTHENTICATED DATA OBJECTS

(71) Applicant: ROYAL BANK OF CANADA, Montreal (CA)

(72) Inventors: Karim Talal Hamasni, Toronto (CA); Charles Plant St. Louis, Toronto (CA); Graham Henry Miller, Toronto (CA); Atilla Murat Firat, Toronto (CA); Ugobame I. Uchibeke, Toronto (CA); Joe Larizza, Toronto (CA); Ioannis Bakagiannis, Toronto (CA)

(73) Assignee: ROYAL BANK OF CANADA, Montreal (CA)

(*) Notice: Subject to any disclaimer, the term of this patent is extended or adjusted under 35 U.S.C. 154(b) by 212 days.

(21) Appl. No.: 15/998,882

(22) Filed: Aug. 16, 2018

(65) Prior Publication Data
US 2019/0058595 A1    Feb. 21, 2019

Related U.S. Application Data

(60) Provisional application No. 62/546,359, filed on Aug. 16, 2017.

(51) Int. Cl.
| | |
|---|---|
| *H04L 9/32* | (2006.01) |
| *G06Q 20/40* | (2012.01) |
| *G06Q 20/02* | (2012.01) |
| *G06Q 20/38* | (2012.01) |

(52) U.S. Cl.
CPC .......... *H04L 9/3247* (2013.01); *G06Q 20/02* (2013.01); *G06Q 20/3825* (2013.01); *G06Q 20/401* (2013.01); *H04L 9/3239* (2013.01); *G06Q 2220/00* (2013.01); *H04L 2209/38* (2013.01); *H04L 2209/56* (2013.01)

(58) Field of Classification Search
CPC . H04L 9/3247; H04L 9/3239; G06Q 20/3825; G06Q 20/401; G06Q 20/02
USPC ......................................................... 713/176
See application file for complete search history.

(56) References Cited

U.S. PATENT DOCUMENTS

| | | | |
|---|---|---|---|
| 2014/0095883 A1* | 4/2014 | Kirillov | H04L 9/3247 713/176 |
| 2016/0260169 A1* | 9/2016 | Arnold | G06Q 40/12 |
| 2016/0283941 A1* | 9/2016 | Andrade | G06Q 20/3829 |
| 2017/0236123 A1* | 8/2017 | Ali | G06Q 20/3825 705/75 |
| 2017/0278186 A1* | 9/2017 | Creighton, IV | G06Q 20/401 |

(Continued)

*Primary Examiner* — Dant B Shaifer Harriman
(74) *Attorney, Agent, or Firm* — Norton Rose Fulbright Canada LLP

(57) ABSTRACT

Current systems for data authentication, such as in the course of financial transactions to comply with anti-money laundering and know-your-customer legislation, are burdensome and inefficient for banks and their clients. A platform of some embodiments provides a system for utilizing distributed ledger technologies, such as a blockchain data structure residing on a distributed ledger. A client may use this blockchain data structure to register the client's personal information in a data object that then may be routed to specific identified trusted individuals who verify that the information in the data object is correct. Once verification is complete, the client or other trusted individuals may use the data object as necessary to register the client for various programs or services, such as additional bank services.

20 Claims, 23 Drawing Sheets

(56) References Cited

U.S. PATENT DOCUMENTS

| | | | |
|---|---|---|---|
| 2018/0089683 A1* | 3/2018 | Setty | G06Q 20/065 |
| 2018/0101842 A1* | 4/2018 | Ventura | G06F 3/0619 |
| 2018/0183600 A1* | 6/2018 | Davis | G06F 21/64 |
| 2018/0189732 A1* | 7/2018 | Kozloski | G06F 8/71 |
| 2018/0323980 A1* | 11/2018 | Ahn | H04L 9/0631 |
| 2019/0028277 A1* | 1/2019 | Jayachandran | H04L 9/085 |
| 2019/0378352 A1* | 12/2019 | Dey | G07C 5/0841 |

* cited by examiner

FRUSTRATING CLIENT EXPERIENCE

HOW SECURE?

BRUTE FORCE ATTACK

WOULD TAKE MORE YEARS
THAN THE AMOUNT OF ATOMS

IN THE OBSERVABLE UNIVERSE

1501

First Name
Middle Name
Last Name
Occupation
Type of Business
Name of Employer
Business Phone Number
Business Extension
Address Looks good!

Approve
Reject

Review Pending Submissions

Approve For Regulation

FIG. 15

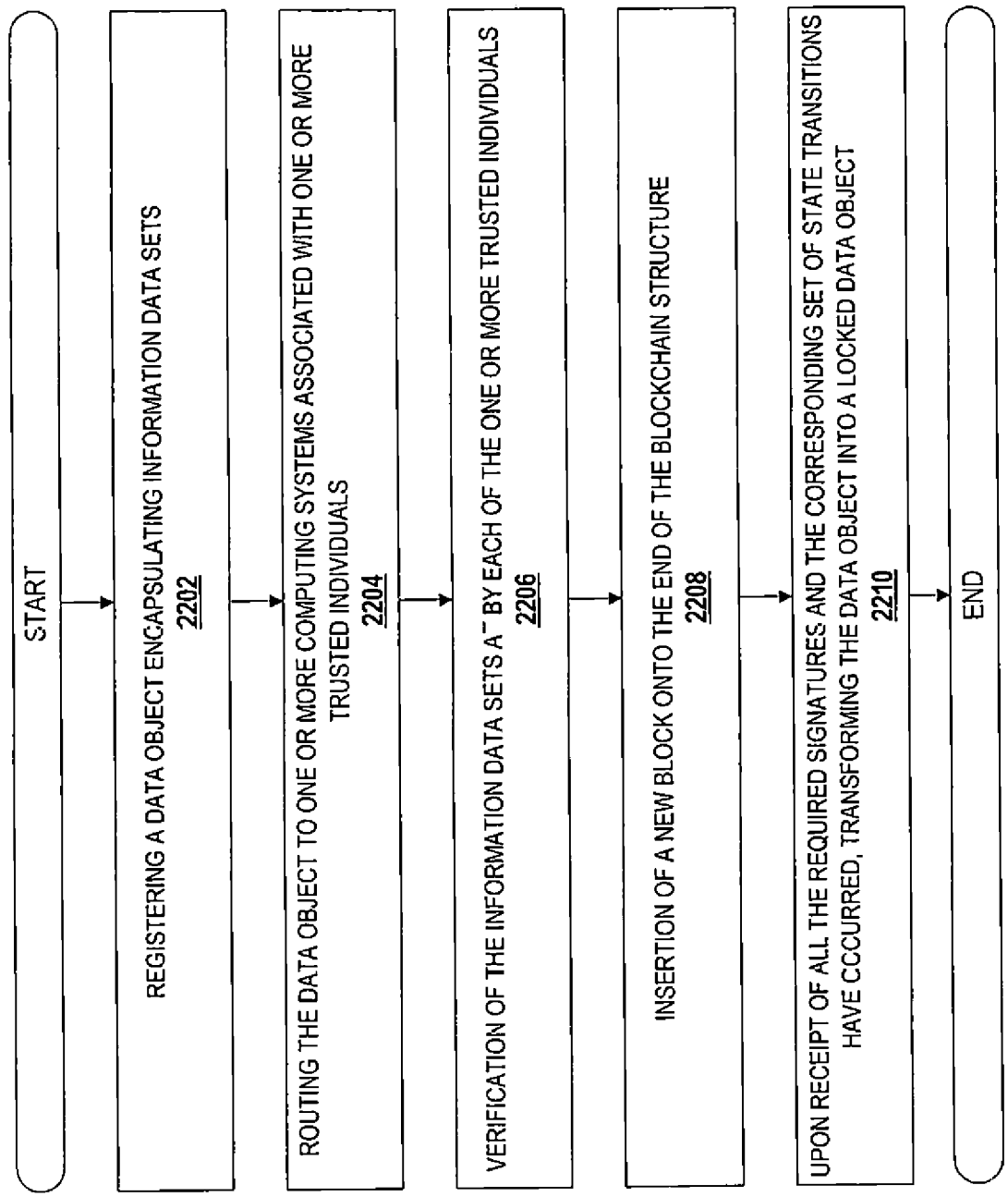

PLATFORM FOR GENERATING AUTHENTICATED DATA OBJECTS

CROSS REFERENCE

This application is a non-provisional of, and claims all benefit, including priority, to: U.S. application Ser. No. 62/546,359, entitled: PLATFORM FOR GENERATING AUTHENTICATED DATA OBJECTS, filed 16, Aug. 2017, incorporated herein by reference.

FIELD

The present disclosure generally relates to the field of data storage, and more specifically relates to the generation of authenticated data objects that may be utilized for securely establishing identity or veracity of an individual, the data objects, or contents stored therein.

INTRODUCTION

A challenge encountered in the context of financial transactions is the secure and efficient storage and verification of data relating to customers. Both anti-money laundering and know-your-customer legislation require certain actions by banks and other entities engaging in financial transactions. Complying with these legal requirements can be onerous, costing significant resources in terms of time, money, and effort, particularly where multiple entities are involved.

Customers also have a direct interest in the security of their personal information and the efficiency of their interactions with banks. Providing a better banking experience to customers is an important element of customer service provided in a competitive banking market.

SUMMARY

An improved distributed data architecture is provided wherein improved data structures are encapsulated in relation to enhancements in secured data storage for verified information sets. Cryptographic approaches are utilized whereby one or more trusted individuals and their corresponding secret/private encryption keys are utilized to affix digital signatures to authentication data objects.

In some embodiments, the order of the affixing of digital signatures is maintained in the verification process such that authentication only occurs if the individuals affix their digital signatures in a specific order (e.g., permutation instead of combination). In further embodiments, the system is a distributed ledger-based system whereby data objects are inserted (e.g., added at the end of a blockchain data structure as a new block). Accordingly the verified data objects can be used to securely establish that know-your-client steps have been taken, and enhanced security/privacy in some embodiments where the data objects store only representations of the underlying information being adduced (e.g., a one-way hash derived from information resident on a driver's license).

Data objects, as represented by individual chains of blocks on a blockchain data structure, can undertake state transitions as additional levels of verification are appended, for example, by way of digital signatures provided by trusted entities. Each digital signature or combination thereof can be used as an input in a state transition, each state transition establishing a new block on the chain of blocks for a data object.

The blocks on the chain of blocks can be cryptographically linked internally in the system by a blockchain management mechanism which maintains a set of corresponding private/public keys that are used for cascaded cryptographic linkages. For example, each subsequent operation to add a block at the end of a chain requires a corresponding private key to validate the insertion at the consensus level.

An incorrect private key leads to rejection of the insertion. In an example embodiment, upon a final insertion where a final state transition is enacted, the blockchain management mechanism appends the final block but does not save the private key for additional insertions, and thus the final block is permanently "locked" and additional blocks cannot be added to the chain.

The data objects, during encapsulation for insertion, include headers, metadata or control instruction sets which indicate how the data objects can be signed, and in what order signatures need to be provided. For example, the data objects include state information and state transition information, which dictate how and under what conditions the data object transitions from an unlocked data object to a locked data object.

Trusted entities (e.g., individuals or automated computing systems) are able to interact with the data objects by affixing digital signatures to the data objects, and if the digital signatures are acceptable based on the state transition information stored thereon, the data object is irreversibly transformed with each affixing of a digital signature.

In an embodiment, after full set of digital signatures being affixed as indicated within the state transition information stored thereon, the data objects are irreversibly locked. The transformed data objects (e.g., in a fully transformed or partially transformed state) can be utilized for authentication or enhanced verification. For example, a third party accessing the data structure, which, in some embodiments, is publicly accessible, or in other embodiments, is a private data structure accessible by a limited number of entities, is able to easily validate and verify that the information stored within the data structure corresponding to a specific data object has been verified by at least one trusted entity. Where increased trustworthiness is required, additional digital signatures may be required.

The data objects, after transformation, can be utilized for authentication across various platforms in a siloed institutional architecture. For example, a data object representing a verified driver's license is securely stored and upon verification by an individual having reviewer credentials and access at a particular branch, the data object is transformed and locked. Accordingly, the individual is able to utilize this transformed, locked data object to validate transactions or provide as proof of identity, etc., at other branches, even without physical display of a driver's license. The locked data object can be taken at a higher level of trust, as an immutable record of digital signatures are stored or associated with the locked data object.

As every digital signature is added, each modification/state change of the locked data object is propagated across the distributed ledgers of each computing node, for example, as a new block to be added to a blockchain data structure such that an entity accessing the blockchain through a distributed ledger stored on a particular computing node is able to validate through traversal of the blockchain by accessing the latest blocks, and if cross-encryption (e.g., cascaded encryption) is utilized as between latest blocks and earlier blocks on the blockchain, validation based on prior block connections is possible, increasing a potential security and immutability of a blockchain solution for verification of locked data objects. The underlying information stored in the locked data object is irreversibly endorsed by the individuals whose public keys directly map to the private keys used to generate the signatures for transformation.

Example use scenarios are varied. As a specific non-limiting example, the locked data objects can be utilized in relation to financial institution verification, especially where a financial institution's backend computing platforms are silo-ed relative to one another and unable to cross validate easily. The locked data objects can also be used for other types of transactions, such as provisioning as an additional token during a transaction to provide an enhanced security profile (e.g., to validate purchases over $150), being used in place of an actual signature, among others. Furthermore, the usage of the locked data objects is not limited to the financial services realm in some embodiments, a use scenario can include peer review of paper submissions (e.g., each successive peer review can be used to irreversibly transform the locked data object such that increasing levels of trust may be applied, which the public is able to see). In respect of paper submissions, the locking transformations may not only be in relation to peer reviews, but may also be conducted based on the success or failure of third party to replicate results to verify findings, among others, enhancing reproducibility of findings.

In accordance with one aspect, there is provided a computer implemented method for provisioning a locked authentication data object, the method comprising: registering a data object encapsulating information data sets associated with an individual onto a cryptographically secured chain of data blocks on a distributed ledger such that the data package is only accessible with a client private key associated with the individual; routing the data object to one or more computing systems associated with one or more trusted individuals, each trusted individual being associated with a trusted individual private key; upon verification of the information data sets by each of the one or more trusted individuals, receiving, from each computing system of the one or more computing systems, a corresponding digital signature associated with the corresponding trusted individual; appending the one or more digital signatures of the one or more trusted individuals to the data object; and transforming the data object and the one or more digital signatures into a locked data object.

In accordance with another aspect, there is further provided said computer implemented method wherein the information data sets include client information.

In accordance with another aspect, there is further provided said computer implemented method wherein each digital signature is generated by each computing system of the one or more computing systems based on a corresponding private key of the corresponding trusted individual.

In accordance with another aspect, there is further provided said computer implemented method and private key wherein each digital signature is hash values generated using the corresponding private key of the corresponding private individual.

In accordance with another aspect, there is further provided said computer implemented method wherein the one or more trusted individuals include at least a plurality of trusted individuals; and the verification is required to be in a specific sequence by each of the corresponding trusted individuals.

In accordance with another aspect, there is further provided said computer implemented method and trusted individuals wherein the specific sequence of verification is represented during the step of transforming the data object and the one or more digital signatures into a locked data object.

In accordance with another aspect, there is further provided said computer implemented method, trusted individuals, and specific sequence of verification wherein the specific sequence of verification is represented by each digital signature being appended to the information data sets prior to a subsequent signing of the data object by the one or more computing systems In accordance with another aspect, there is further provided said computer implemented method comprising registering the locked authentication data object to the cryptographically secured chain or data blocks on the distributed ledger.

In accordance with another aspect, there is further provided said computer implemented method comprising registering the locked authentication data object to a second cryptographically secured chain of data blocks on the distributed ledger.

In accordance with another aspect, there is further provided said computer implemented method comprising registering the locked authentication data object to a second cryptographically secured chain of data blocks on a second distributed ledger.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, herein in the figures:

FIG. 15 is an illustration showing an alternate example of a front end user web interface for a bank employee;

FIG. 22 is an example method diagram illustrating an example method for generating a locked data object, according to some embodiments.

DETAILED DESCRIPTION

The platform for generating authenticated data objects disclosed herein seeks to address some identity related challenges by providing a system for utilizing distributed ledger technologies, such as a blockchain data structure residing on a distributed ledger. The system is adapted to interface or control a series of distributed computing nodes, each distributed computing node storing a copy of the distributed ledger data structure whose updates are propagated throughout the computing nodes by way of electronic communication. The updates are, in some embodiments, provided in the form of updated data blocks which are appended onto or otherwise connected to a linked data structure of data blocks.

Figure 1A:
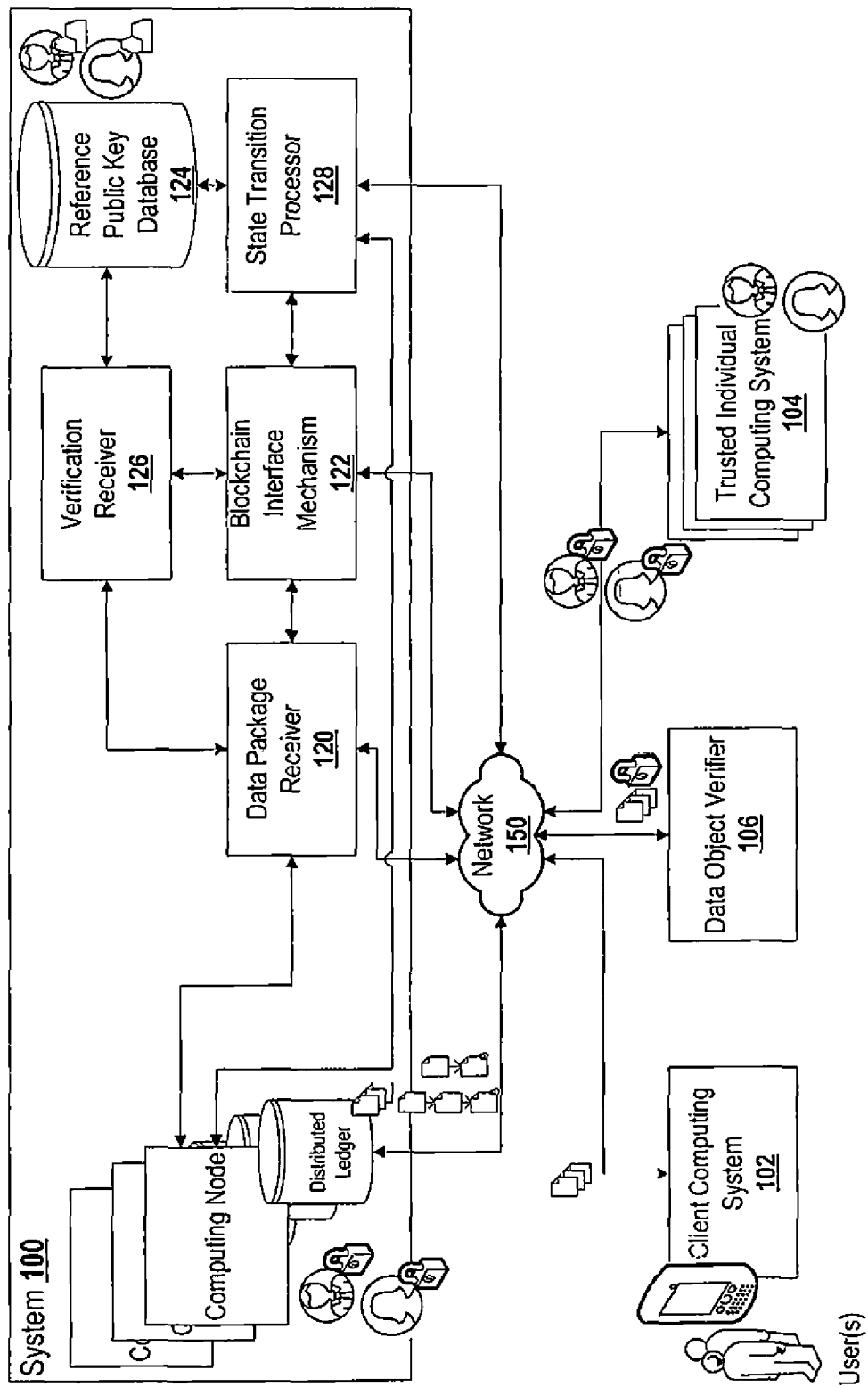
FIG. 1A is a block schematic of a computer implemented system for provisioning a locked authentication data object, according to some embodiments.

FIG. 1A is a block schematic of a computer implemented system for provisioning a locked authentication data object, according to some embodiments. Referring to FIG. 1A, a block schematic of an improved distributed data architecture 100 is provided, according to some embodiments.

The block schematic shown includes units, modules, and other mechanisms that are implemented using computer processors and computer memory. In particular, the units, modules, and other mechanisms communicate across electronic networks and in some embodiments, distributed data architecture 100 is a specific computer server resident at a data center that is configured to track and/or otherwise maintain the set of data objects, electronically coupled to a plurality of external or internal computing nodes which are synchronized and maintain the distributed ledgers in accordance with a consensus mechanism.

The improved distributed data architecture 100 is configured to provide a data object verification/transformation engine, which is a platform for encapsulating and otherwise generating data objects. These data objects are stored on a blockchain data structure which is replicated across the computing nodes in accordance with a consensus mechanism. The blockchain data structure stores a series of cryptographic data structures (e.g., "blocks"), which can include state transition information. In another embodiment, state transition information is instead provided as part of the consensus mechanism.

Cryptographic approaches are utilized whereby one or more trusted individuals and their corresponding secret/private encryption keys are utilized to affix digital signatures to authentication data objects. These digital signatures can be, for example, from an trusted authority, such as a branch manager, an approval authority, among others.

The data object can, in some embodiments, include an encrypted data object, such as personal information (e.g., driver's license information), which is populated onto system 100 by a client computing system 102 (e.g., a client may use an interface on a mobile device to store this information as an electronic token). The personal information may also be a representation of personal information, for example, a one-way hash of information relating to a driver's license, such that the driver's license information itself is not stored on the data object. In another embodiment, the personal information in the initial data object for population is encrypted using a user's public key such that the user or the user's computing device is able to decrypt it using the user's private key (e.g., stored only on on-board memory of the user's computing device 102).

Data objects, as represented by individual chains of blocks on a blockchain data structure, can undertake state transitions as additional levels of verification are appended, for example, by way of digital signatures provided by trusted entities.

The blocks on the chain of blocks can be cryptographically linked internally in the system by a blockchain management mechanism which maintains a set of corresponding private/public keys that are used for cascaded cryptographic linkages. For example, each subsequent operation to add a block at the end of a chain requires a corresponding private key to validate the insertion at the consensus level.

Aside from a progenitor block encapsulating the original personal information (or representation thereof), each block is sequentially linked to a predecessor block using a key-pair of public and private keys which govern whether additional blocks will be accepted for insertion onto an existing chain of blocks. In particular, the consensus mechanism is established whereby a private key is stored in a computer memory (e.g., at trusted individual computing system 104) for each blockchain that can be utilized for establishing a next state transition. When a new digital signature is appended to an existing chain of blocks representing a data object, this private key is used to ensure that the insertion is accepted.

On the final insertion, in accordance with the state transition conditions and mechanism, in some embodiments, the private key for adding a new block onto the chain is not recorded, or discarded, or never generated, according to various embodiments. For example, if it is never generated, the final block has an insertion mechanism that simply has an unknown private key (e.g., it cannot be unlocked since nobody knows what the private key should be). For example, the final block may simply utilize a public key that was not generated along with a corresponding private key. An improvement of using a final block that is not capable of being unlocked is that once know your client or anti-money laundering activities are satisfied, there are no further modifications capable to the data object and it can be utilized to establish an audit trail. Accordingly, the trusted individual computing system 104 includes a secure enclave or secure storage resident thereon which tracks public/private key pairs used to establish the blocks. Once the blocks have transitioned to a final state, there are only public keys remaining to ensure finality in block insertions.

Each digital signature or combination thereof can be used as an input in a state transition, each state transition establishing a new block on the chain of blocks for a data object. A client computing system 102 may then generate a private/public key pair such that the client is able to have a private key (e.g., residing on on-board memory of the client computing system 102). The client computing system 102 may receive an input from the client initiating an access request of the private information stored on the data object. Electronic communication occurs across network 150.

The client information is electronically transmitted to a data package receiver 120 configured to register a data object encapsulating information data sets associated with an individual onto a cryptographically secured chain of data blocks on a distributed ledger such that a data package is only accessible with a client private key associated with the individual.

The data object, for example, can be transmitted to the branch manager's computing device 106 at a time of sign up. A blockchain interface mechanism 122 coupled to a computing node hosting the distributed ledger is configured to route the data object to one or more computing systems 104 associated with one or more trusted individuals, each trusted individual being associated with a trusted individual private key. A reference database 124 of public keys is provided to associate public identities of individuals, such that digital signatures may be validated against public keys to establish the veracity of a digital signature.

In some embodiments, the order of the affixing of digital signatures is maintained in the verification process such that authentication only occurs if the individuals affix their digital signatures in a specific order (e.g., permutation instead of combination).

Upon verification of the information data sets by each of the one or more trusted individuals, a verification receiver 126 is configured to receive, from each computing system of the trusted entities, a corresponding digital signature associated with the corresponding trusted individual. Accordingly, a chain of approval requirements may be encapsulated into business logic either at the data object layer (e.g., as metadata or header information), or at the consensus mechanism of the system 100, or a combination of both areas.

The chain of approval requirements may, in some embodiments, require a specific sequence of digital signatures, or simultaneous digital signatures, among others. In some embodiments, the data objects further contain data fields in which any additional comments may be appended to the data objects (e.g., comments on approval), or an acceptance/rejection status. When the requisite digital signatures are appended to the data object, the data object may, be automatically converted by state transition processor 128 from a first state to a second state, or from a second state to a third state, etc. The state transition processor 128 is further configured for transforming the data object and the one or more digital signatures into a locked data object as a final transitionary state.

At the final transitionary state, the block is stored on the distributed ledger of cross-encrypted data blocks, but the final data block is signed with a public key that is discarded such that the corresponding private key cannot be regenerated, and thus the final data block is a locked data block that can no longer be interacted with by update messages.

The system 100 is a distributed ledger-based system whereby data objects are inserted (e.g., added at the end of a blockchain data structure as a new block). The data objects, during encapsulation for insertion, include headers, metadata or control instruction sets which indicate how the data objects can be signed, and in what order signatures need to be provided. For example, the data objects include state information and state transition information, which dictate how and under what conditions the data object transitions from an unlocked data object to a locked data object. The data objects are stored in the form of cryptographically linked data blocks, the cryptographically linked data blocks including specific keypairs such that a corresponding private key is required to append new data blocks to an existing data block.

Each chain of data blocks represents a data object as it is being interacted with through appending or otherwise transforming the data blocks through a series of update messages that are parsed into new data blocks appended to the chain of data blocks. Each new data block represents an updated digital signature that is used to append to the data object, if the update message is compliant with one or more state transition conditions (e.g., the digital signature must match a public key as provided in a reference table of public keys associated with trustworthy individuals or entities).

Trusted entities (e.g., individuals or automated computing systems) are able to interact with the data objects by affixing digital signatures to the data objects, and if the digital signatures are acceptable based on the state transition information stored thereon, the data object is irreversibly transformed with each affixing of a digital signature. The transitions are maintained in sequential order through additional data blocks being appended to the chain of blocks associated with a particular data object.

The state transition may occur responsive to the receipt of the digital signatures, and in some embodiments, the state transition processor 128 is a daemon process that is periodically run across all blocks and nodes of the blockchain data structure and system 100, or in some embodiments, is a smart contract stored thereon the blockchain data structure that can be invoked to cause a state transition.

The states may represent, for example, whether a data object has been signed or not, a trust level associated with the data object, and in some embodiments, a "complete" state may further be triggered whereby the data object is locked for transformation and is immutably stored on the blockchain data structures on the distributed ledgers and can no longer be modified (e.g., no more digital signatures may be appended to it).

The state transition to a completed state may aid, for example, in improving audits, ensuring that "know your client"/anti-money laundering steps have been complied with. For example, the "know your client"/anti-money laundering steps may require digital signatures from authorized individuals at financial institutions who are able to physically validate client credentials prior to opening financial accounts. In some embodiments, the state transition mechanism 128 is further configured to automatically trigger workflows relating to opening of accounts and reconciliation of client profiles with accounts, among others. As the opening of accounts is tied directly to the satisfaction of know your client/anti-money laundering requirements in some embodiments, an improved and immutable data structure audit trail is established.

A block explorer tool of a data object verifier 106 may be utilized to query the blockchain, the block explorer tool configured to interface with a computing node to submit a query, or to access parts of the blockchain data structure to assess the state, and access the data stored with the data object as well as any digital signatures. Where the data object is encrypted, a corresponding private key may be required prior to access. In an embodiment, after full set of digital signatures being affixed as indicated within the state transition information stored thereon, the data objects are irreversibly locked.

The data object verifier 106, in some embodiments, is configured to traverse the blockchain data structure on one or more distributed ledgers by connecting to corresponding one or more computing nodes. For increased levels of confidence, in some embodiments, data object verifier 106 connects to multiple distributed ledgers simultaneously or within a period of time to confirm data objects. Data objects are confirmed by traversing the blockchains stored on the distributed ledgers to the most recent block in respect of a chain representing a data object.

Each most recent block can be assessed against the digital signatures stored within the most recent block. The signatures are compared against reference public key database 124, each successful comparison indicating that a trusted entity or individual has signed off in respect of the information stored within the data block, as originally provided in the earliest block of the chain of blocks.

As the digital signatures are derived based at least on a combination of a private key of the trusted entity and the underlying information stored in the data block (or subsequent blocks having subsequent digital signatures, in accordance with another embodiment wherein order matters), the digital signatures can be compared against a reference database or data structure of public keys (e.g., exposed keys) that are used to establish that, for example, know your client or anti-money laundering steps have been taken.

For example, a signature may indicate that a branch manager physically reviewed a driver's license with the person being physically present, etc. In other scenarios, the signatures can be used against a publicly accessible database of public keys, each indicating, for example, that a professor or peer reviewer actually reviewed a particular thesis or paper stored in a data object, etc.

Even data objects that have not reached a final transitionary stage (e.g., locked) can be used, albeit with lower levels of trust and/or confidence. For example, a paper requiring four peer reviewers may have three peer reviews, but the data object stored in the chain can be used to indicate that an increased level of trust can be placed into the results, although not to the level of a fully peer reviewed paper.

The transformed data objects (e.g., in a fully transformed or partially transformed state) can be utilized for authentication or enhanced verification. For example, a third party accessing the data structure, which, in some embodiments, is publicly accessible, or in other embodiments, is a private data structure accessible by a limited number of entities, is able to easily validate and verify that the information stored within the data structure corresponding to a specific data object has been verified by at least one trusted entity. Where increased trustworthiness is required, additional digital signatures may be required.

The data objects, after transformation, can be utilized for authentication across various platforms in a silo-ed institutional architecture. Opening an account may allow for an increased trust level associated with information provided in a data object, and the transformed data object itself can be utilized as an enhanced security token for conducting transactions. The transformed data object, decrypted with the client's private key, may be adduced or otherwise transmitted from a client's computing device 102 as a token for authenticating other activities or other products at a financial institution, for example.

Existing authentication infrastructure resident on the client's computing device 102 may be combined such that the client's computing device 102 is able to receive an authorization signal that unlocks the use of the client's private key which may be stored on on-board memory on the client's computing device 102. An example authorization signal may be the provisioning of a password or a fingerprint/face print in respect of on-board touch or facial recognition data stored in a secured enclave.

In an example, a data object representing a verified driver's license is securely stored and upon verification by an individual having reviewer credentials and access at a particular branch, the data object is transformed and locked. Accordingly, the individual is able to utilize this transformed, locked data object to validate transactions or provide as proof of identity, etc., at other branches, even without physical display of a driver's license. The locked data object can be taken at a higher level of trust, as an immutable record of digital signatures are stored or associated with the locked data object.

As every digital signature is added, each modification/state change of the locked data object is propagated across the distributed ledgers of each computing node, for example, as a new block to be added to a blockchain data structure such that an entity accessing the blockchain through a distributed ledger stored on a particular computing node is able to validate through traversal of the blockchain by accessing the latest blocks, and if cross-encryption (e.g., cascaded encryption) is utilized as between latest blocks and earlier blocks on the blockchain, validation based on prior block connections is possible, increasing a potential security and immutability of a blockchain solution for verification of locked data objects. The underlying information stored in the locked data object is irreversibly endorsed by the individuals whose public keys directly map to the private keys used to generate the signatures for transformation.

Example use scenarios are varied. As a specific non-limiting example, the locked data objects can be utilized in relation to financial institution verification, especially where a financial institution's backend computing platforms are silo-ed relative to one another and unable to cross validate easily. The locked data objects can also be used for other types of transactions, such as provisioning as an additional token during a transaction to provide an enhanced security profile (e.g., to validate purchases over $150), being used in place of an actual signature, among others. Furthermore, the usage of the locked data objects is not limited to the financial services realm in some embodiments, a use scenario can include peer review of paper submissions (e.g., each successive peer review can be used to irreversibly transform the locked data object such that increasing levels of trust may be applied, which the public is able to see).

In some embodiments, the trusted individual computing system 104 is further configured to initiate one or more workflows or processes upon a final locking (or other transition) of the data object blockchain. For example, a control signal may be generated to establish a financial account, to disburse funds, to publish a paper marked as fully peer reviewed, among others. The blockchain then remains on the distributed ledgers so that third parties can clearly validate the steps taken to ensure the veracity of the document.

In a further preferred embodiment, the locked data object is used to conduct other validations across different segments of business within an organization or with third parties. For example, the locked data object can be used as a token that provides enhanced verification of the identity of the individual. In a non-limiting scenario, a person may be request a transcript at a university. Rather than providing a copy of the person's driver license, the person can simply request that the university access the blockchain using the data object verifier 106 to assess a stored data object, traversing down the blockchain across linked blocks to validate specific signatures, etc. such that the university is able to determine that specific trusted entities had signed off and this person is more likely to be who they are. The university can check against a publicly database of bank authorizers public keys to determine that Jane Smith, a bank manager at a nearby bank did validate such driver's license.

In a further embodiment, the data object verifier 106 includes a

Figure 1B:
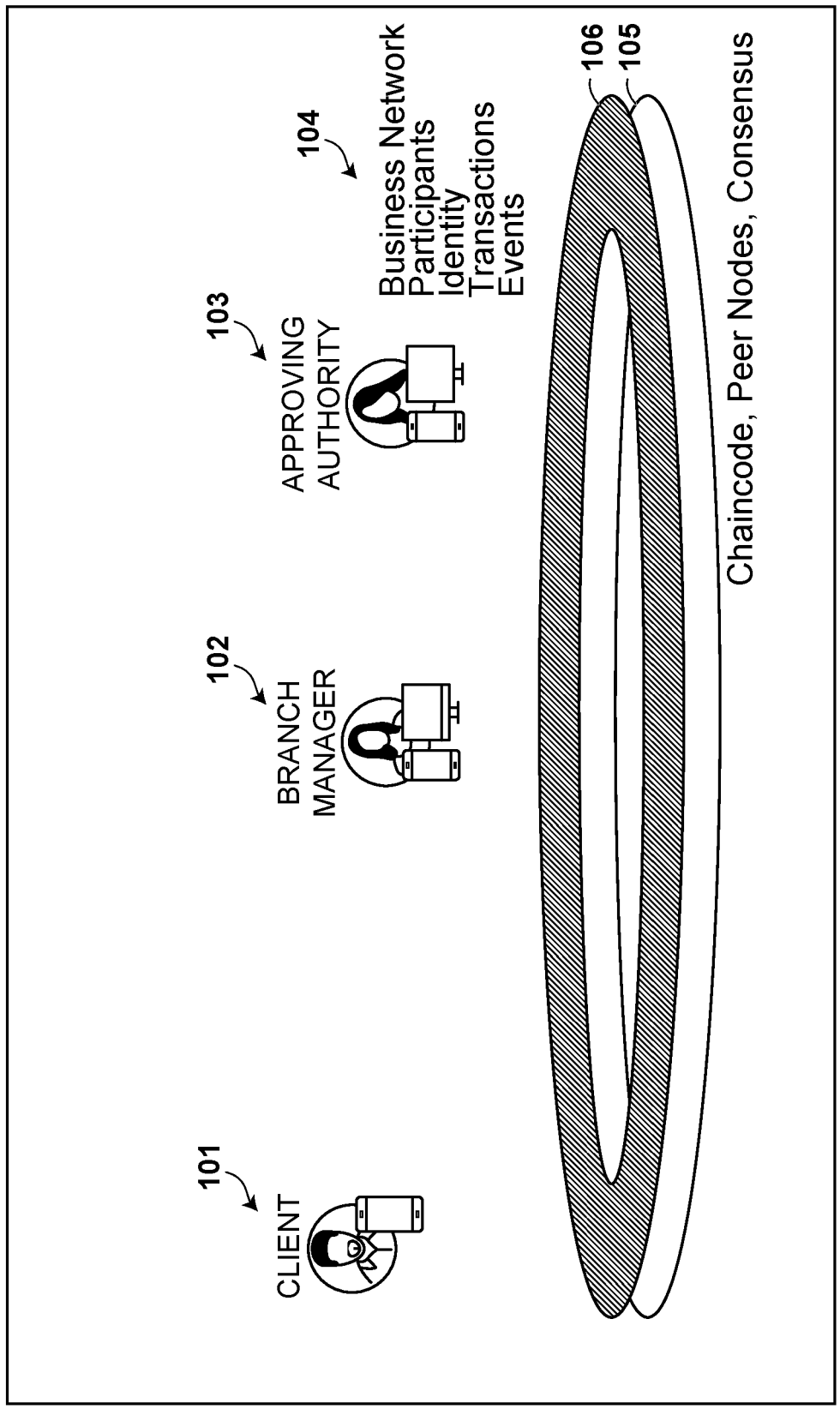
FIG. 1B is an illustration of an example of a platform upon which parties to a business network (i.e., a client, a branch manager, and an approving authority) may interact with an authenticated data object and an authenticated, secure data structure that resides on a blockchain (e.g., built from Hyperledger™ Fabric), represented by the grey layer, which includes chain code, peer network codes, and consensus algorithms with a REST API middleware, represented by the blue layer, that connects the blockchain and the user facing application, and a client and employee facing application (e.g., mobile iOS™ application, web application), represented above the layers.

Referring to FIG. 1B, in some embodiments, a platform is provided upon which parties to a business network (e.g., a client 101, a branch manager 102, and an approving authority 103) may interact with an authenticated data object and an authenticated, secure data structure that resides on a blockchain 105 and a REST API middleware 106 connecting the blockchain 105 and a user-facing application used by the client 101, the branch manager 102, and the approving authority 103.

Figure 2:
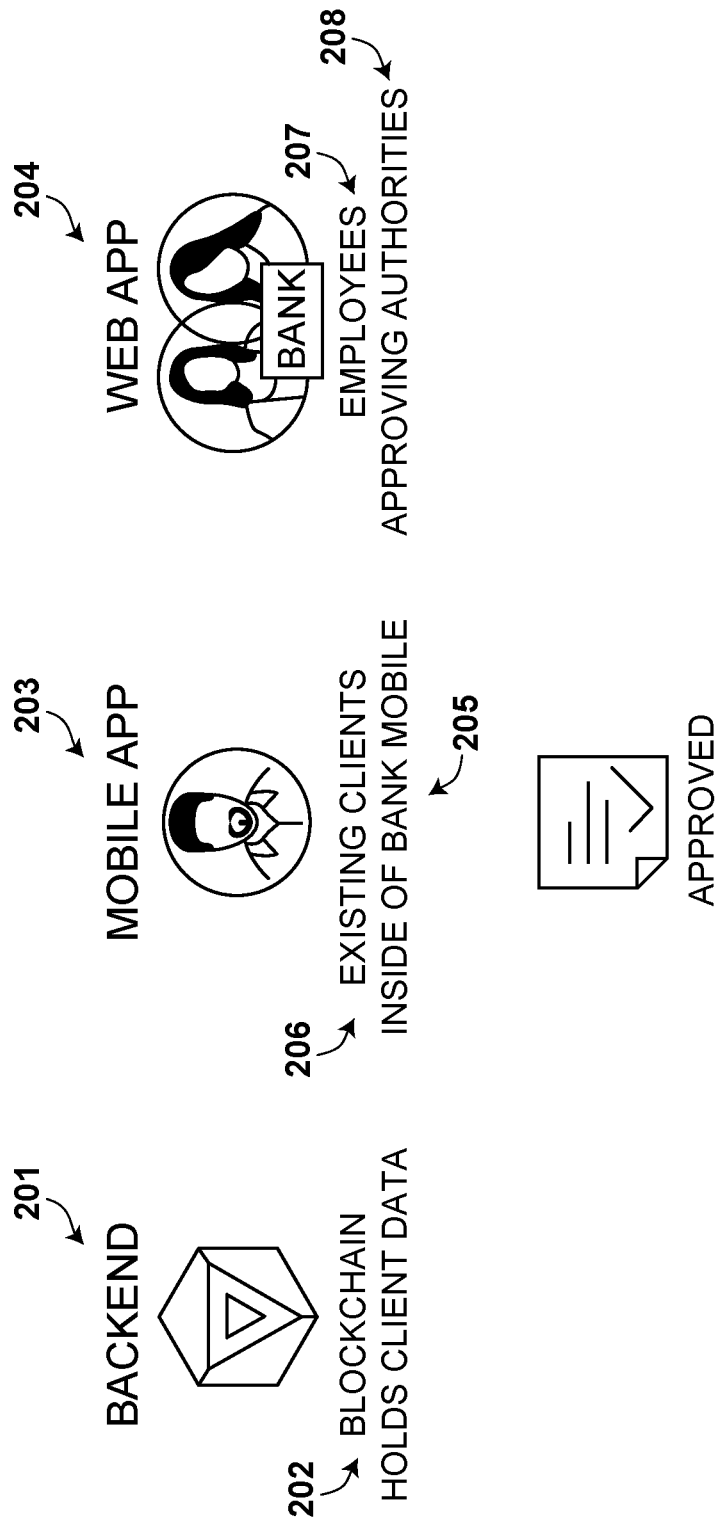
FIG. 2 is an illustration showing an example of a back end blockchain network and a front end user interface for clients and bank employees.

Referring to FIG. 2, in some embodiments, a backend system 201 consisting of a blockchain 202 holding client data specially configured to interface with one or more front end systems consisting of a mobile application 203 and a web application 204. For example, in some embodiments, a mobile application 203 may integrate with a bank's existing mobile application 205 for existing clients 206. Further, a web application 204 may be used by bank employees 207 or approving authorities 208 in some embodiments.

A client may use this blockchain data structure to register the client's personal information in a data object that then may be routed to specific identified trusted individuals who verify that the information in the data object is correct. Once verification is complete, the client or other trusted individuals may use the data object as necessary to register the client for various programs or services, such as additional bank services. The platform may provide a secure solution and reduces the money, time, and effort currently demanded by such transactions.

Figure 3:
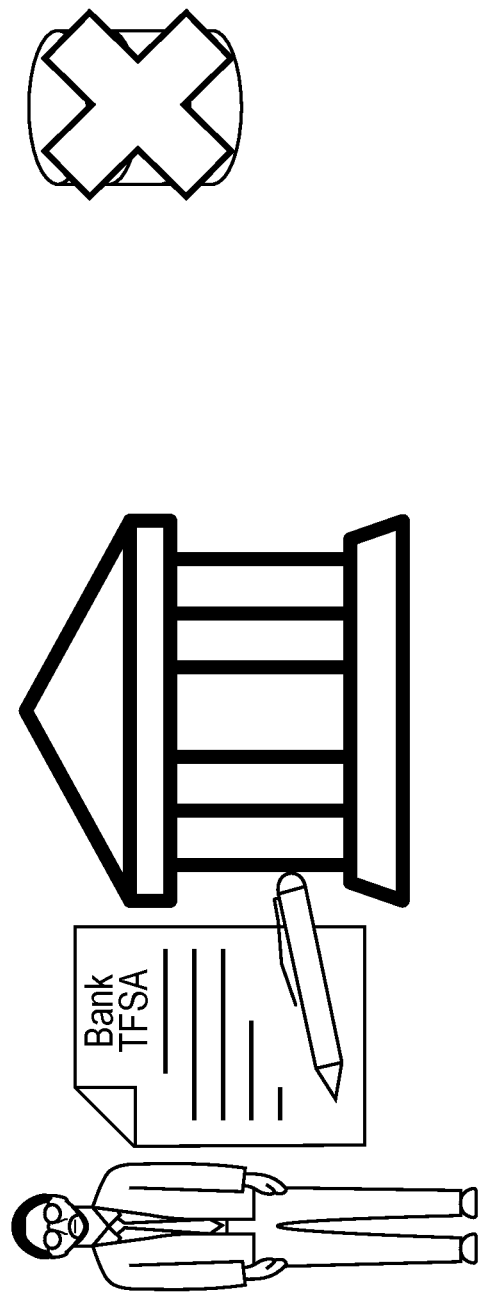
FIG. 3 is an illustration showing an alternate example of the re-collection and re-verification of client information required by financial transactions under an alternate process.

Referring to FIG. 3, in an alternate process, re-collection and re-verification of information is required for each transaction such that the entire re-collection and re-verification process must be redone and data sharing does not occur. The platform for authenticated data objects provides an improvement to the alternate process by providing a platform that, in some embodiments, may use a specially configured computing network (e.g., blockchain and one or more distributed ledgers) such that collection and verification of information can be completed without duplicative processes for data sharing.

Figure 4:
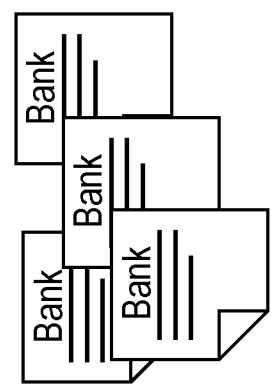
FIG. 4 is an illustration showing an alternate example of client frustration caused by additional paperwork for each new financial transaction under an alternate process.

Referring to FIG. 4, in an alternate process, additional paperwork required for each transaction results in a frustrating client experience. In some embodiments, the platform for authenticated data objects may provide an improvement to the alternate process by permitting transactions to be completed on the platform and without additional paperwork.

Figure 5:
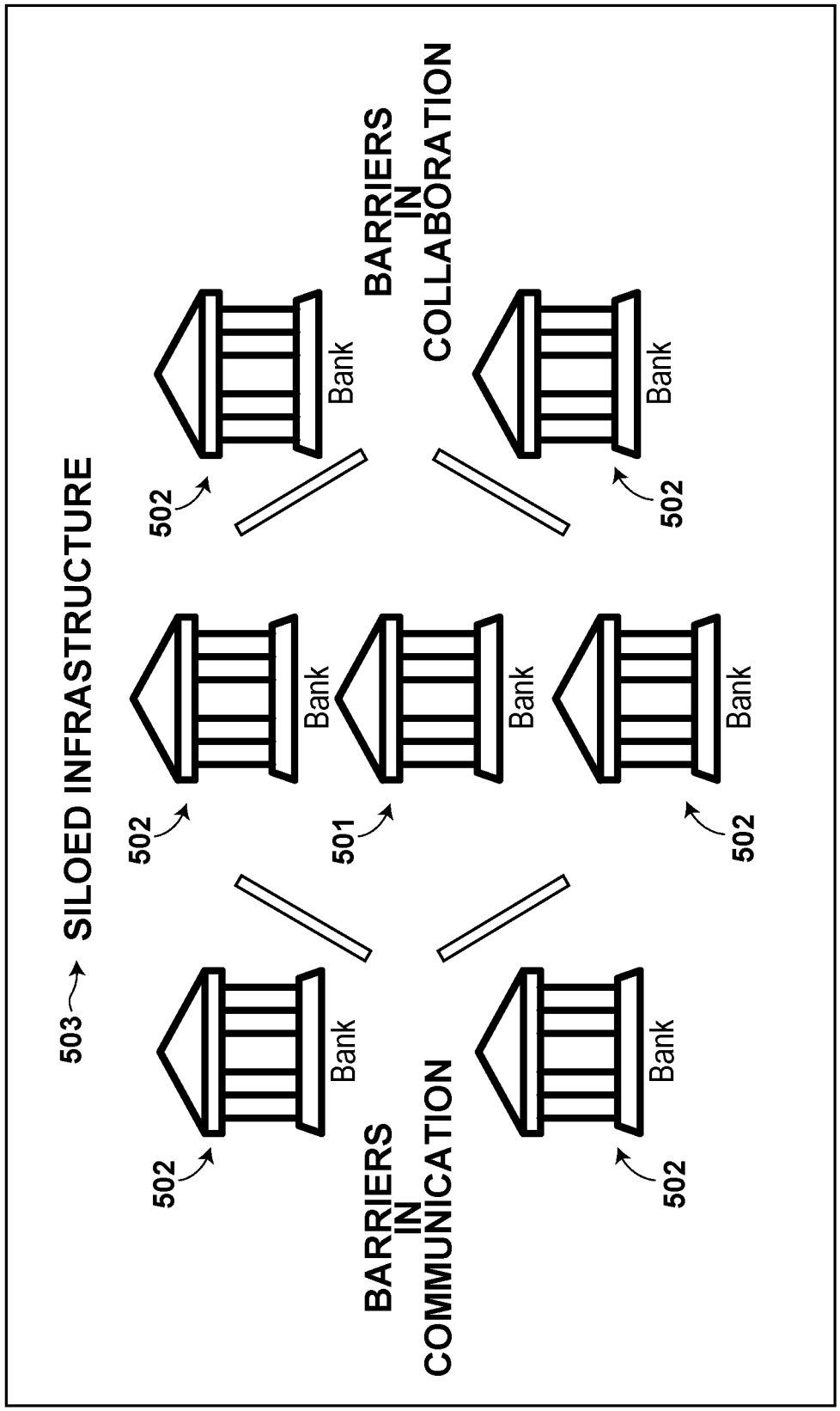
FIG. 5 is an illustration showing an example of a bank operating one or more entities that have barriers to communication and collaboration between them.

Referring to FIG. 5, in an alternate process, a bank 501 may operate one or more entities 502 that have barriers in communication and in collaboration between them as a result of a siloed infrastructure 503. The platform for authenticated data objects, in some embodiments, may provide a system for communication and collaboration between one or more entities by using a specially configured computing system (e.g., blockchain and one or more distributed ledgers) that is an improvement to the alternate process.

Figure 6:
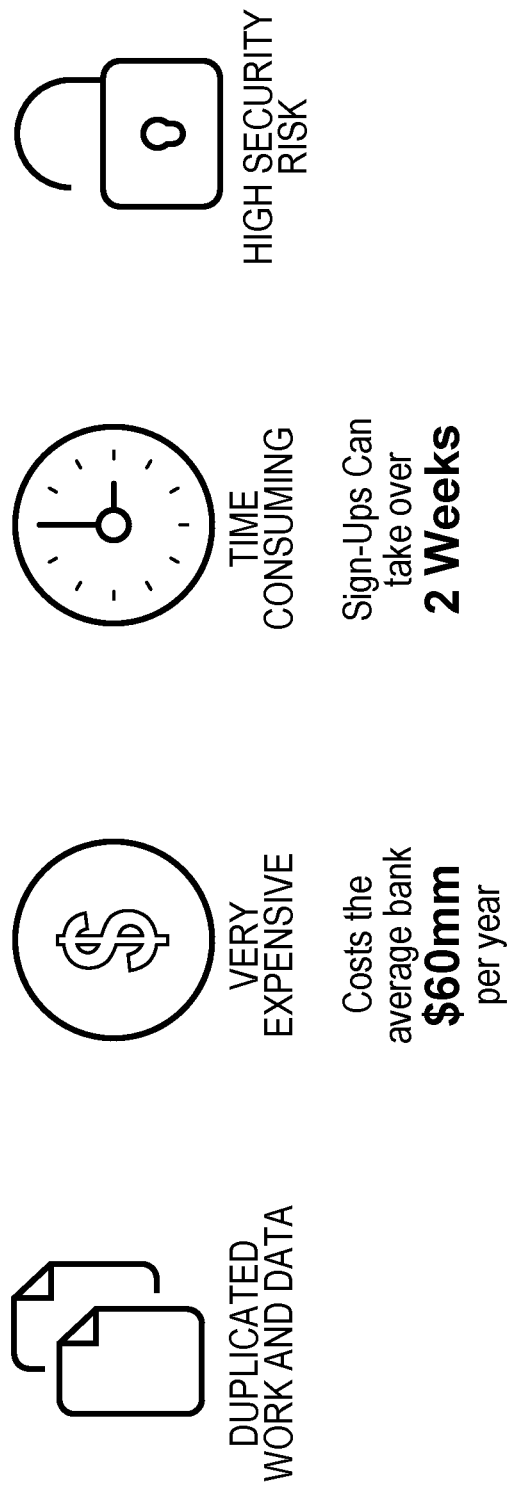
FIG. 6 is an illustration showing an alternate example of costs associated with barriers to communication and collaboration between entities.

Referring to FIG. 6, in an alternate process, a siloed infrastructure 601 results in one or more costs in terms of duplicated work and data, dollar value, time, and security risk. In some embodiments, the platform for authenticated data objects may provide an improvement to the alternate process by using a specially configured computing system (e.g., blockchain and one or more distributed ledgers) and cryptographic systems that may reduce costs.

In some embodiments, the data object may be secured using a cryptographically secured chain of data blocks on a distributed ledger. The data object may only be accessed using a client private key associated with the client.

Figure 7:
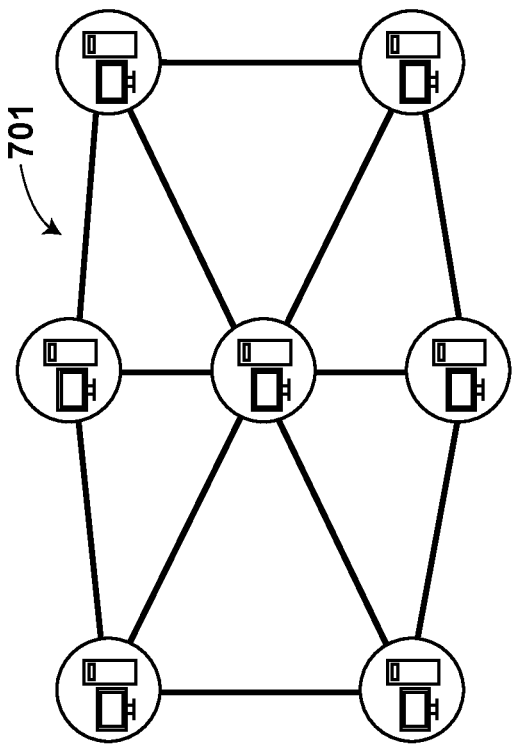
FIG. 7 is an illustration showing an example of a blockchain network for storing and sharing of data.

Referring to FIG. 7, in some embodiments, there is provided a blockchain network 701 that stores and shares data. For example, a data structure may consist of a blockchain combined with one or more distributed ledgers such that public-private key encryption may be implemented by a specially configured computer system. The system may improve security, permanence of record-keeping, and collaboration between one or more computer systems, entities, or parties.

The data object may be routed to one or more computer systems that may be accessed by one or more trusted individuals who each are entrusted with a trusted individual private key. The trusted individual may verify the information contained by the data object, and may receive from each computing system of the one or more computing systems, a digital signature that corresponds to the authorizing trusted individual. The digital signature may then be appended to the data object and may transform the data object with the one or more digital signatures into a locked data object. For example, the data object may contain client information that permits a bank client to authorize the client's enrolment in new bank services.

A digital signature may be generated by each computing system of one or more computing systems in correspondence with a corresponding private key of a trusted individual. Further, the digital signature may be hash values produced through the private key of the trusted individual. For example, a trusted individual may be a branch manager or other bank employee in a transaction concerning bank services.

In some embodiments, verification by one or more trusted individuals may require verification by at least a plurality of trusted individuals conducted in a specific sequence of each trusted individual. For example, the sequence of trusted individuals to complete verification may be represented during the step of transforming the data object into a locked data objects by using the one or more digital signatures. For example, a cascaded set of cryptographic mechanisms can be used, whereby cryptographic hashes are utilized on top of one another to establish sequence.

For example, where H is a cryptographic hash function, H(3, H(2, H(1, DO))) can be used, whereby changing the orders of the hashing would lead to altogether different results (and only one is acceptable).

The public keys of the trusted individuals, used in order, can be used to validate that the trusted individuals each did sign the locked data object, and whether the correct order of signing was used can be, for example, identified based on a cascaded set of cryptographic hashes.

Figure 8:
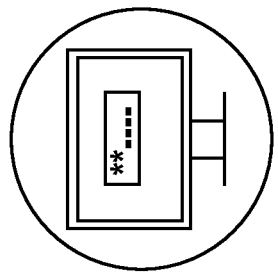
FIG. 8 is an illustration showing an alternate example of the security level of a blockchain network.

Referring to FIG. 8, in some embodiments, a blockchain network is provided that is computationally difficult to breach. For example, a data structure specially configured to implement public-private key encryption through the use of blockchain and one or more distributed ledgers may be computationally difficult to breach through "brute force" because a cryptographic hash function is used such that any different order of the hashing would not be acceptable, with only one order being acceptable.

In some embodiments, a locked authentication data object may be cryptographically secured to one or more cryptographically secured chains of data blocks on a distributed ledger. The unlocked data object for authentication may, in some cases, be provided on a first distributed ledger for digital signing (e.g., a more trusted ledger), and a second, different distributed ledger for dissemination and use.

There may be interactions between the first and second distributed ledgers, and their stored data structures, for example, for verification of digital signatures of trusted individuals, etc. The first and the second distributed ledgers can be configured differently, for example, the encryption can be stored in sequential order of the digital signatures (e.g., each signing causing the generation of a new block) so that the order and sequence of signatures can be reconstructed. When a verification request is required, second distributed ledger can be used for a "first pass" verification, and the first distributed ledger can be used for a deeper verification against individual signatures. Accordingly, different levels of performance and security can be implemented on each of the distributed ledgers (as the requirements, number of transactions, trustworthiness of actors, etc. are different).

In some embodiments, a system is provided for utilizing distributed ledger technologies (e.g., such as a blockchain data structure residing on a distributed ledger). For example, an implementation may be provided as a software layer built on top of a blockchain, such as Hyperledger™. The system is configured such that a client to be able to register the client's personal information in a data object on the data structure (e.g., blockchain) using a client private key that is already associated with the client's account (e.g. from a mobile banking login).

For example, RSA is a public-key cryptosystem that may be used in data security. RSA operates with two encryption keys: a public encryption key and a private decryption key. The public encryption key may be distributed to those who communicate with the holder of the private decryption key, while the private decryption remains private and is mathematically difficult to compute, even in possession of the public encryption key.

A public-private key encryption system, e.g., RSA, may be utilized to encrypt and decrypt client information in a data object. For an additional example, a blockchain may consist of a series of blocks, each containing a link to a previous block, transaction data, and a timestamp. Blockchain data structures and their underlying distributed ledgers may be used as a decentralized distributed ledger to record transactions, generally by utilizing a peer-to-peer network that adopts and applies a validation protocol for new blocks such that recorded data in any particular block may not be retroactively altered without altering all subsequent blocks with the collusion of the network majority. The specific characteristics may vary depending on the rules that govern the provisioning of the distributed ledger (e.g., propagation rules, consensus rules, validation rules).

For example, blockchain may be used as a data structure on which some embodiments may register client information through the use of public-private key encryption.

This data object can then be routed to specific identified trusted individuals (e.g., bank employees) to verify that the information in the data object is correct. The data object can then be signed by that a trusted individual (e.g., bank employee) with the individual's private key (e.g., employee's private key). One or more trusted individuals (e.g., signing employees) may be required to verify information, which could be required to be in a specific sequence or could be in any order. Once verified, the data object may be locked.

The locked data object may also then be used by the client, or by other approved trusted individuals (e.g., bank employees) as necessary when registering the client for various programs or services (e.g., additional bank services).

The locked data object may provide technical solutions to aid with using blockchain technologies to support 'Know Your Customer' (KYC) and 'Anti-Money Laundering' (AML) processes as well as the customer sign up process. The system reduces and/or eliminates the need for redundant approvals throughout the KYC/AML process that are repeated every time a client signs up for a new product or service.

By employing smart contracts to the process, the system is configured to automate a large portion of the client on-boarding which could save resources (e.g., time, effort and money). KYC and AML processes can be very paper intensive, duplicated across an organization (e.g., a bank), very costly (e.g., a banking industry average of $60 million per year), has a lot of moving parts, takes a lot of time and may be insecure. While a distributed ledger system with authenticated (e.g., locked) data objects requires processing infrastructure and the establishment of a computing device network, an autonomous, secure platform can be provided that is flexible for different uses and less prone to malicious or unauthorized usage.

Figure 9:
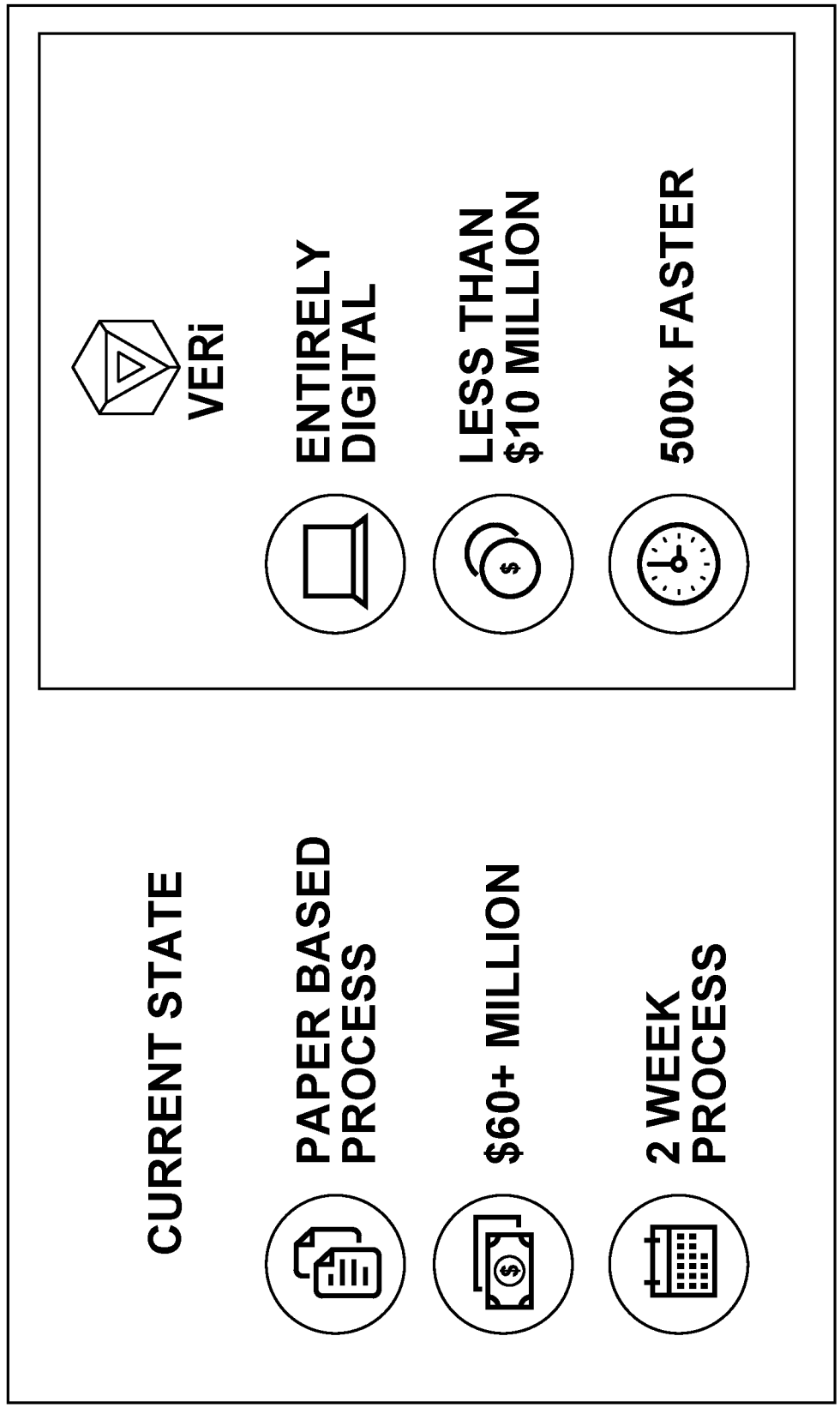
FIG. 9 is an illustration showing an example of some features of some embodiments of the disclosed platform for generating authenticated data objects.

Referring to FIG. 9, in some embodiments, a system is provided that is digital, less expensive than in at least one alternate process, and is significantly faster than at least one alternate process. The platform for authenticated data objects provided, in some embodiments, may use a specially configured computing system (e.g., blockchain and one or more distributed ledgers) such that it may operate digitally, less expensively, and more quickly than the alternate process.

The locked data object is an improved data structure that is configured to allow for departments to share client information securely between each other, for example, in relation to a developed single master record of clients stored in the blockchain. A master record of clients allows for savings on redundancies related with maintaining multiple records for the same client. An aggregated source of data is useful to understand clients better and to offer better products to create an overall better client experience.

Figure 10:
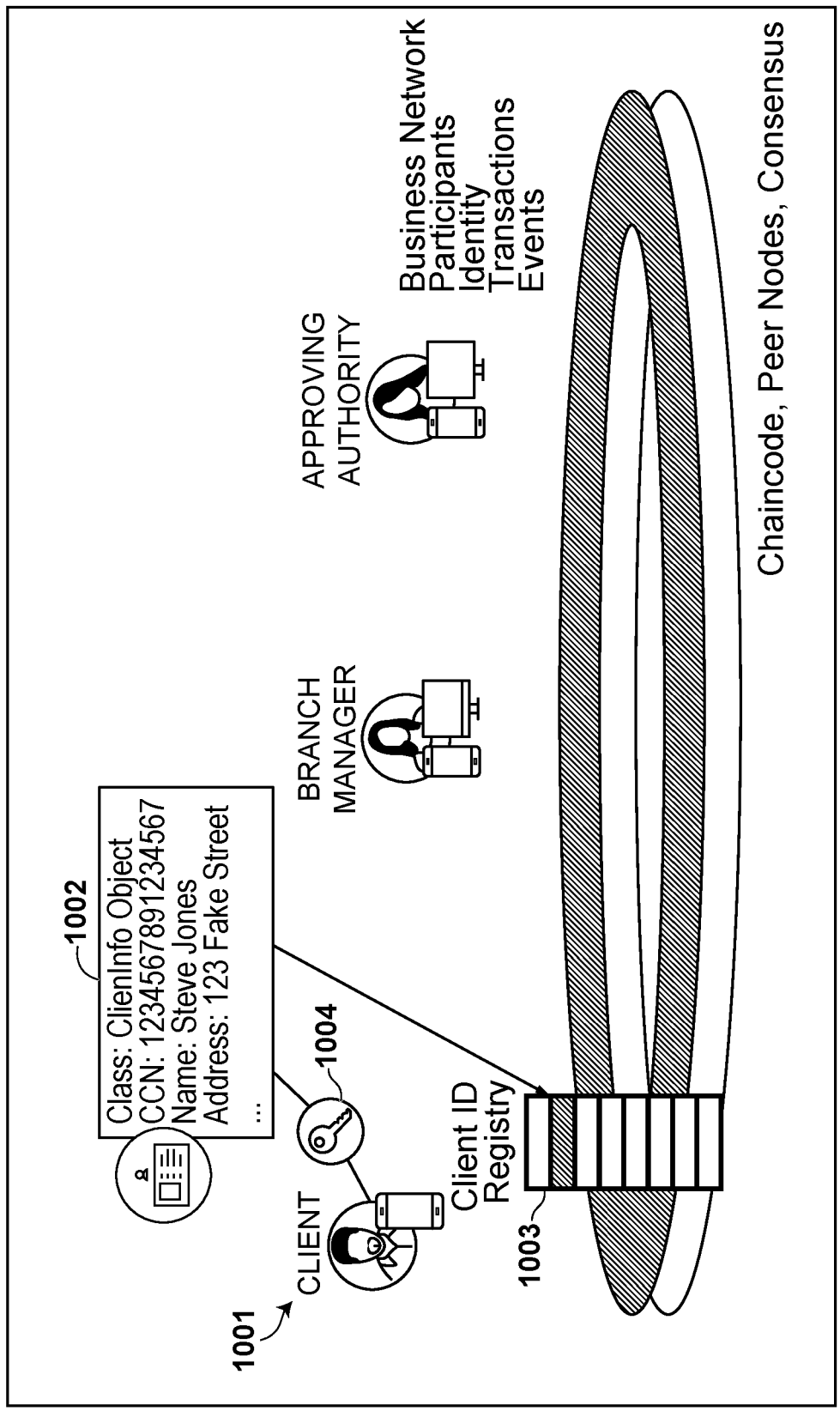
FIG. 10 is an illustration showing an alternate example of participants in a financial transaction in which a client registers to the Client ID Registry such that all client information is stored in the Client ID registry and may only be unlocked for use by the client with his or her private key.

Referring to FIG. 10, in some embodiments, a client 1001 may register the client's information 1002 to a client ID registry 1003 using an encryption key 1004.

Figure 11:
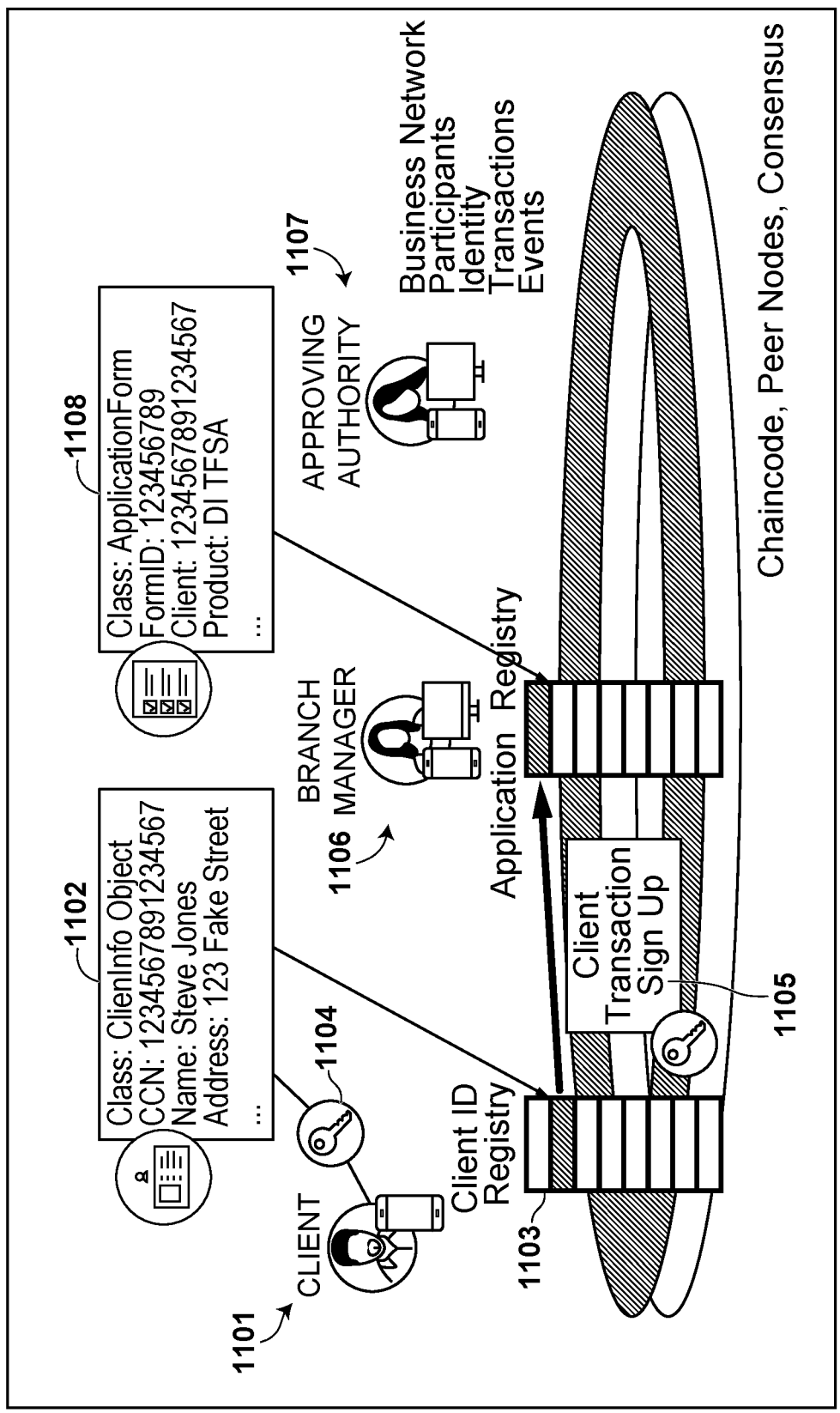
FIG. 11 is an illustration showing an alternate example of participants in a financial transaction in which a client registers to the Client ID Registry and makes an application for additional services.

Referring to FIG. 11, in some embodiments, a client 1101 may register the client's information 1102 to a client ID registry 1103 using an encryption key 1104 then applying a decryption key 1105 to register to an application registry 1106 such that the client 1101 can make an application 1108 for additional services, subject to approval of one or more approving authorities 1107.

Other uses are possible, such as using the locked data object for unrelated application (e.g., processing of a citizenship request by a government website could request a trusted locked data object prior to approval).

Figure 12:
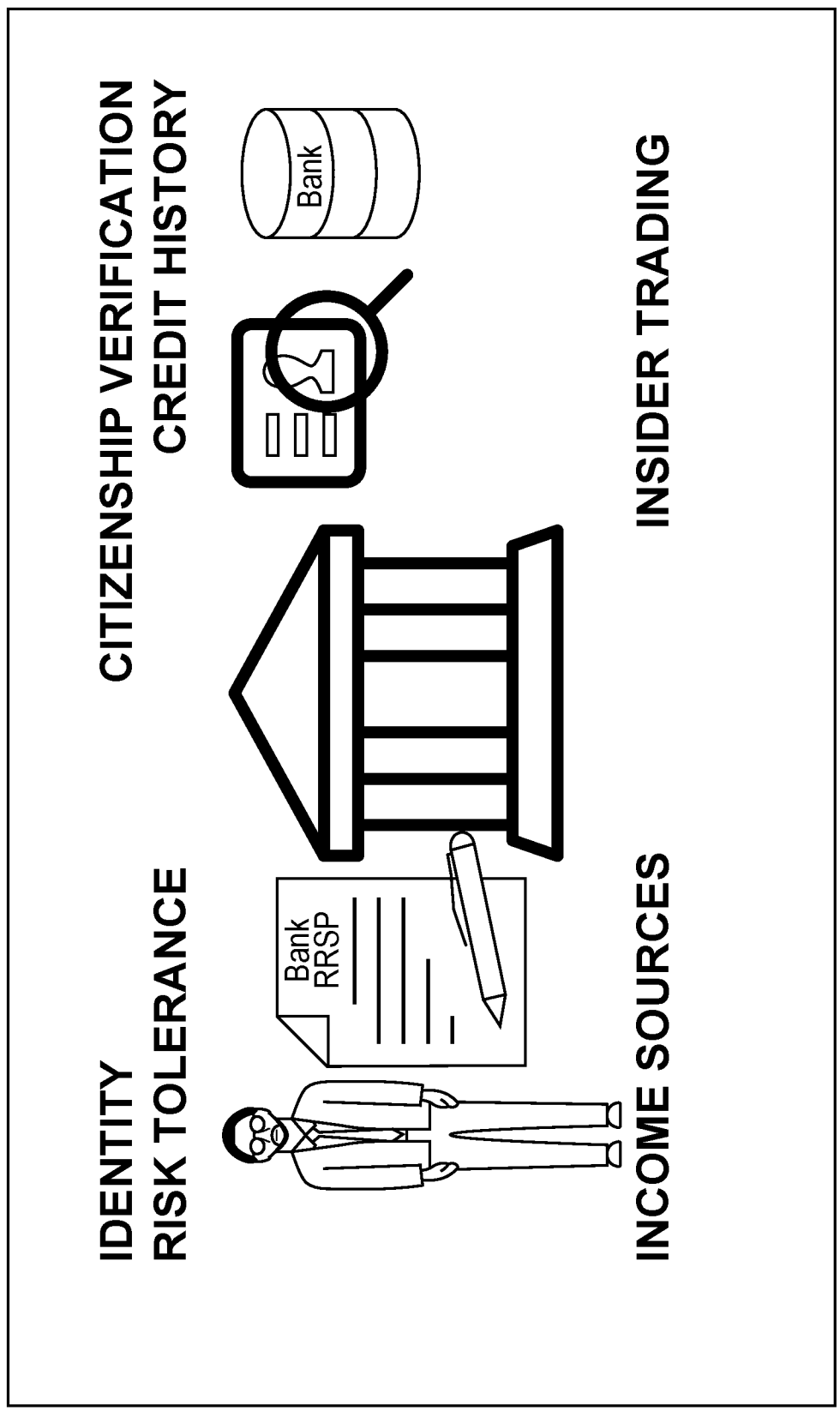
FIG. 12 is an illustration showing an example of client information that may be collected and verified in a financial transaction.

Referring to FIG. 12, in some embodiments, client information collected and verified may include identity, risk tolerance, income sources, citizenship, credit history, and trading history.

Accordingly, a client "digital identity" can be provisioned that represents each client, including client personal information, information related to financial products (e.g., banking products and services), or further unrelated products. More specifically, a client ID can be configured to contain information, such as their client profile details, what products are services they use, etc.

The trusted aspect of the data object, once it is confirmed and locked, allows the data object to be independently validated against a trusted source (e.g., the public digital keys of the trusted individuals). Verification is possible, in some embodiments, as long as the trusted individuals expose their public keys (e.g., so there may be no need to reach out and request validation from the trusted individuals). This reduces a potential bottleneck in current validation systems, where, for example, validation by a bank employee may require calling the bank employee to vouch for the individual.

In some embodiments, the client can have a private key to the digital identity and is the sole controller of the data indefinitely and the private key may be computationally difficult to breach. If a client were to update their information it may be immediately transferred back to the digital identity and stored on the blockchain. A difficult-to-modify (e.g., practically immutable) "paper trail" of the data history can be provided, and this trail can be easily audited.

In some embodiments, the process of Letter of Authorization (LOAs) can be digitized. LOAs are typically used for moving money from different accounts and when a client wants to have secure transactions.

A process, for example, includes the following: a financial institution prints the form for the client, seals it in an envelope, sends it to the client, where the clients waits for it in the mail, signs it, sends it back. This process takes multiple days and occurs over a million times per year at the bank.

An improved solution, instead, using specially configured computing devices, may include the having trusted individual (e.g., bank employee) interface with a web application where the trusted individual, input the clients ID and the LOA autocompletes the letter for the transaction. Then, the employee submits it where it is sent to the client, where the client gets a push notification for the LOA. The client then logs onto the platform via an interface and clicks on the Authorize tab where the client sees the new LOA and then the client may review it and e-sign it with Touch ID™ or another security protocol and push it out.

In some embodiments, a system is provided consisting of three parts: a distributed service that consists of one or more smart contracts (i.e., transactions), assets, participants and events (e.g., events may be built on Hyperledger Fabric™); a REST API or one or more other protocols as middleware that allows a mobile and a desktop application to connect to the above distributed service (e.g., blockchain); and a web application powered by the above blockchain.

Figure 13:
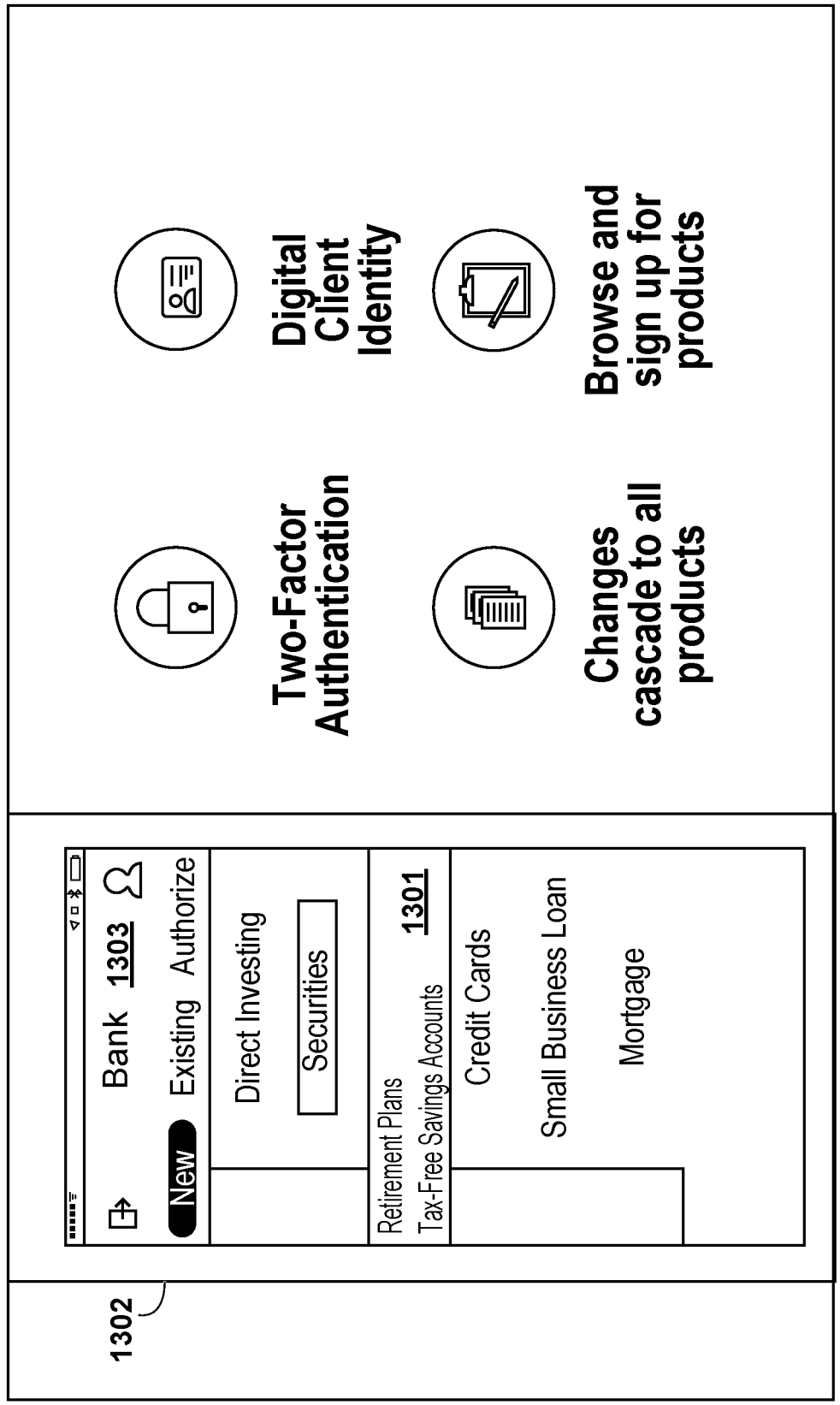
FIG. 13 is an illustration showing an alternate example of a front end user mobile interface for a client.

Referring to FIG. 13, in some embodiments, a front end user mobile interface 1301 is provided that may be displayed on a mobile device e.g., a mobile telephone 1302. The interface may be integrated with a bank's existing application 1303 in some embodiments. In some embodiments, the interface 1301 may further provide one or more features, including two-factor authentication, digital client identity, cascading changes to all products, and browsing and enrolling in products.

The web application may be integrated into participant applications (e.g., a bank's own customer application). For example, the web application may be an iOS™ application such that clients may use the application by interacting with an interface displaying one or more of text, shapes, colours, and other visuals to securely unlock the client's information through a computer computing the decryption of client's information via the client's private decryption key to sign up for products and services (e.g., at a bank). At a bank, for example, investment advisors and employees may use the application with an iPad™ or one or more other computers to sign a client up after the client has unlocked his or her data through the implementation of the client's private decryption key and the computation of the decrypted client information by one or more computers.

Figure 14:
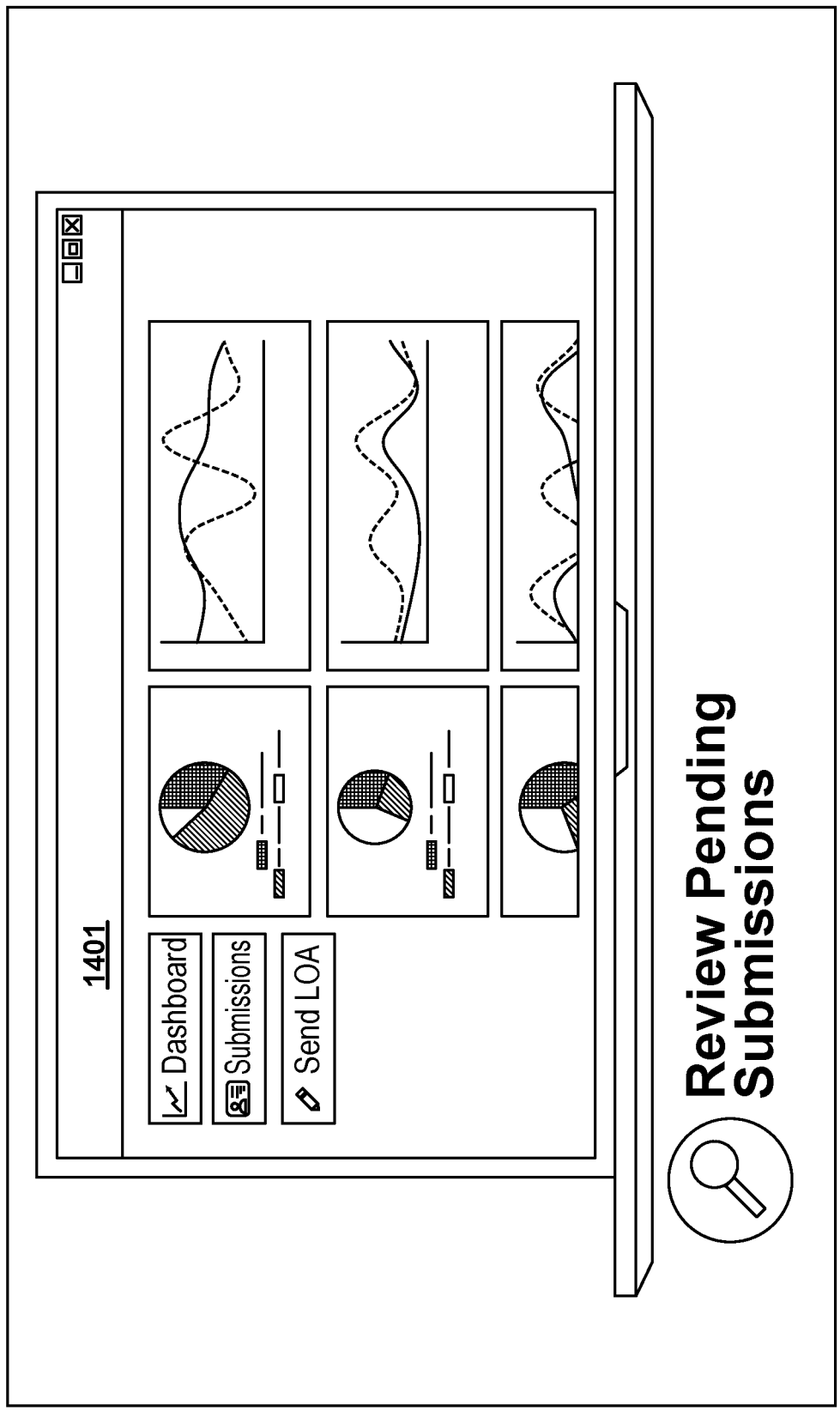
FIG. 14 is an illustration showing an alternate example of a front end user web interface for a bank employee.

Referring to FIG. 14, in some embodiments, a desktop application 1401 may be provided for a bank employee to review pending submissions, send letters of authorization, and navigate to a central dashboard web page.

Referring to FIG. 15, in some embodiments, a desktop application 1501 may be provided for a bank employee to review pending submissions and approve for regulation a transaction.

Figure 16:
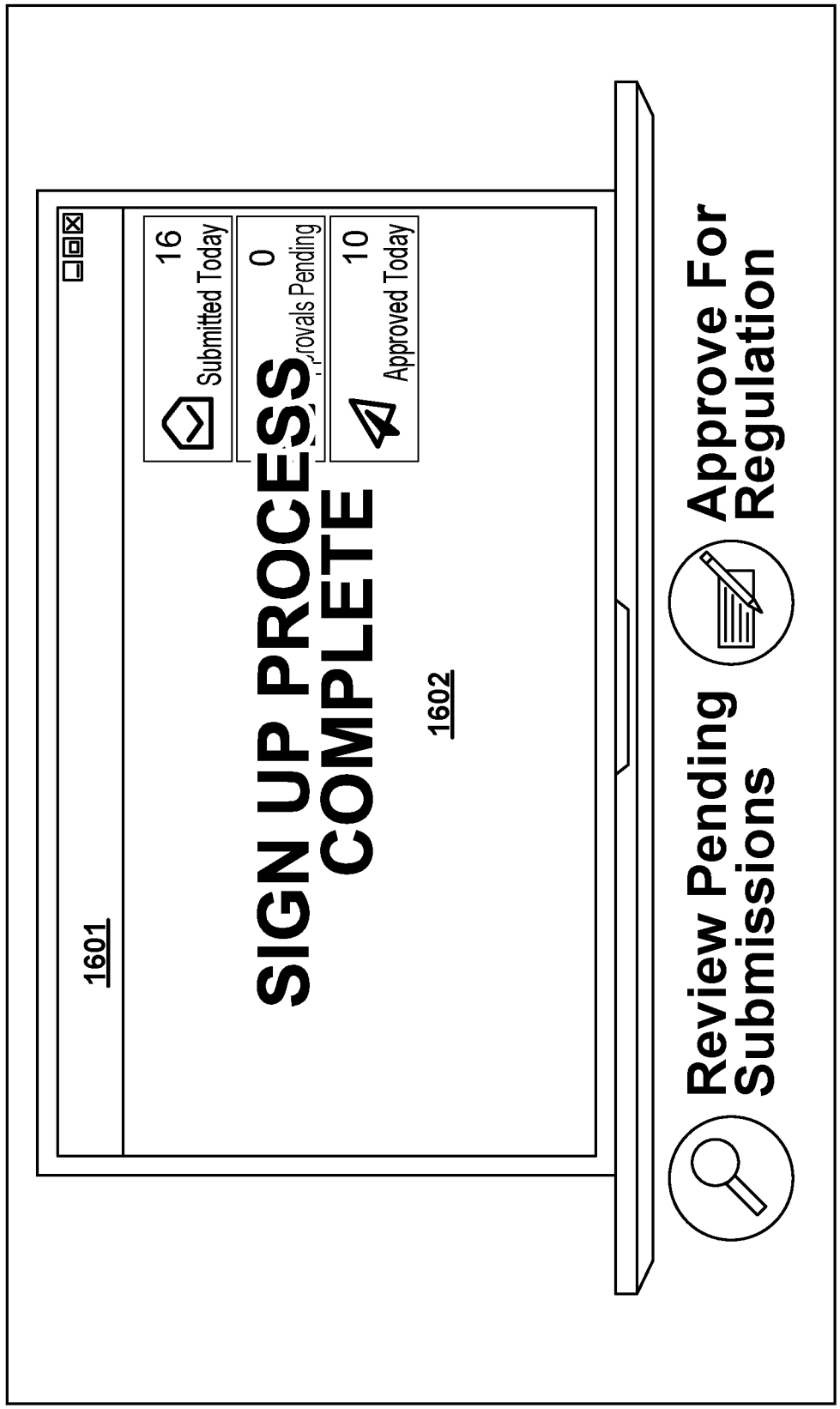
FIG. 16 is an illustration showing an alternate example of a front end user web interface for a bank employee.

Referring to FIG. 16, in some embodiments, a desktop application 1601 may be provided for a bank employee to review pending submissions and approve for regulation a transaction, with an interface displaying text 1602 to indicate an enrolment has been completed by the application 1601.

For another example, the web application may be a desktop application such that employees can use the application through an interface displaying one or more of text, shapes, colors, and other visuals to approve applications for products in their departments where such applications require approval. In some embodiments, the employee may only view (e.g., by obfuscating or redacting other information by controlling a visual interface) the client data that is necessary for that particular application and nothing else.

In some embodiments, a system is provided that is "plug and play" using a microservices architecture. A blockchain is provided that can run many kinds of applications. For example, the API middleware handles things like authentication using a pluggable authentication module. The pluggable authentication module may be updated to use alternate authentication services. The API middleware further may connect participants from a mobile and a desktop application to the blockchain while also providing access to the data in the blockchain in a way that is secure and permissioned. The rest API endpoints may be consumed by other applications to leverage the power of the blockchain network. One or more additional smart contracts (i.e., transactions) for other services may be added as needed.

For example, the system may be deployed and tested using a cloud computing platform, e.g., Amazon Web Services Elastic Compute Cloud instances running a cloud-connected operating system e.g., Ubuntu Linux™. The blockchain node (i.e., server), certificate authorities, orderers, and any other elements may run on distributed environment instances that support the cloud computing platform, e.g., Amazon Web Services™ Linux™.

In some embodiments, a system is provided that controls access to client data and only shows the information that is required for each application to an employee.

In some embodiments, a system may provide two-layer security such that a client must first sign up with his or her regular credentials. If sign up is successful, then the client is assigned a private key that may be used to verify and sign all transactions from the client. The two-layer security may ensure that a bridge in one of the layers does not compromise client data.

In some embodiments, a system is provided such that an employee may onboard one or more new departments and product sign up forms to a web application (i.e., an application powered by a blockchain) with no technical skills. The employee may only select the fields that he or she requires for the product sign, up and add new fields. The employee may interact with specially configured computing elements, including an interface displaying one or more of text, shapes, and other visual elements to enter data about which department or which product the employee means to select. Following selection, the interface may transform the data entered by the employee to execute the requested department or service in conjunction with the client's secure data object.

Figure 17:
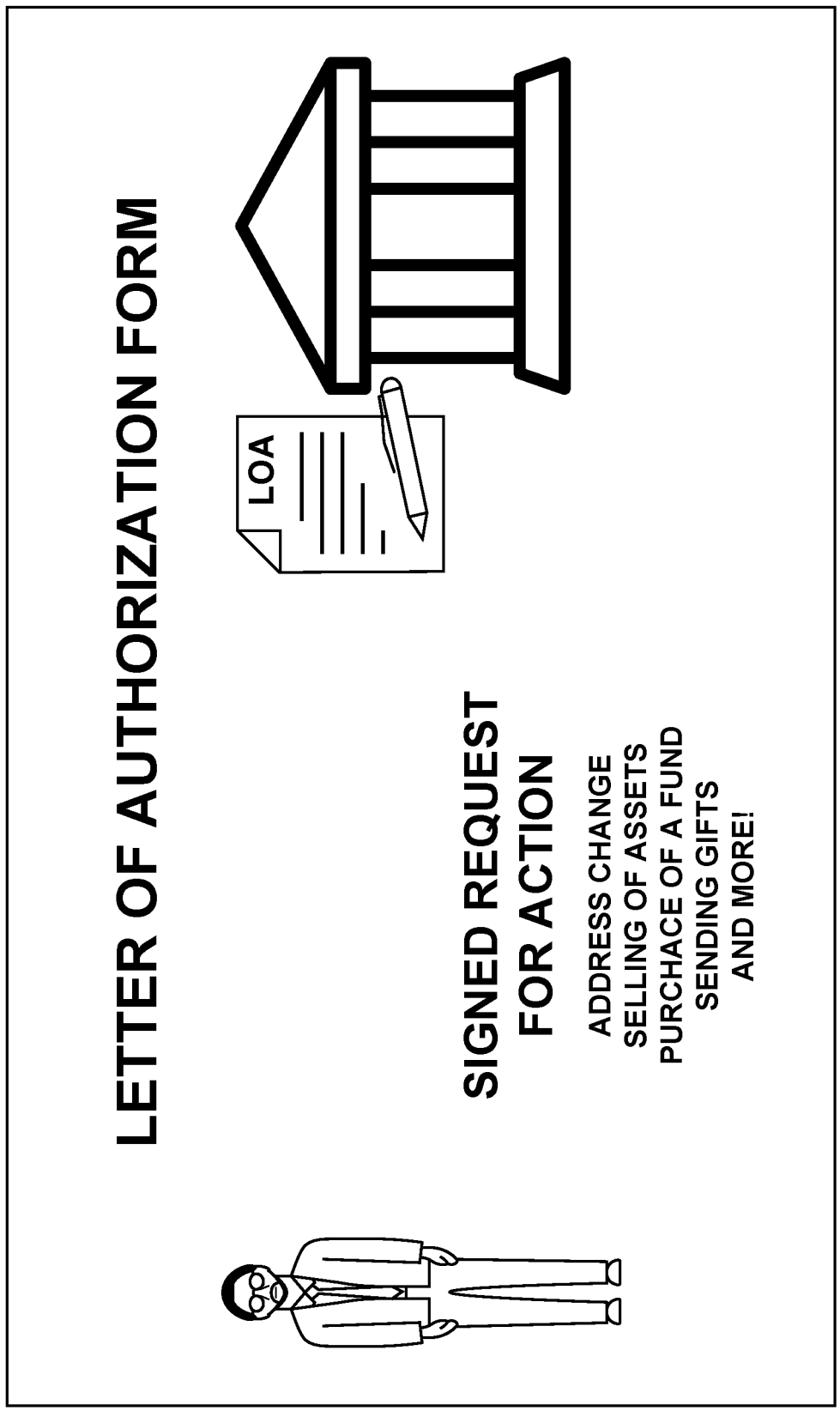
FIG. 17 is an illustration showing an example of a letter of authorization process used to authorize a financial transaction.

Referring to FIG. 17, in some embodiments, a letter of authorization may be requested for one or more actions including address change, selling of assets, purchase of a fund, sending gifts, etc.

In some embodiments, a system is provided that may generate a Letter of Authorization ("LOA") and send the LOA to a client and perform other administrative tasks. This process may include the use of smart contracts.

Figure 18:
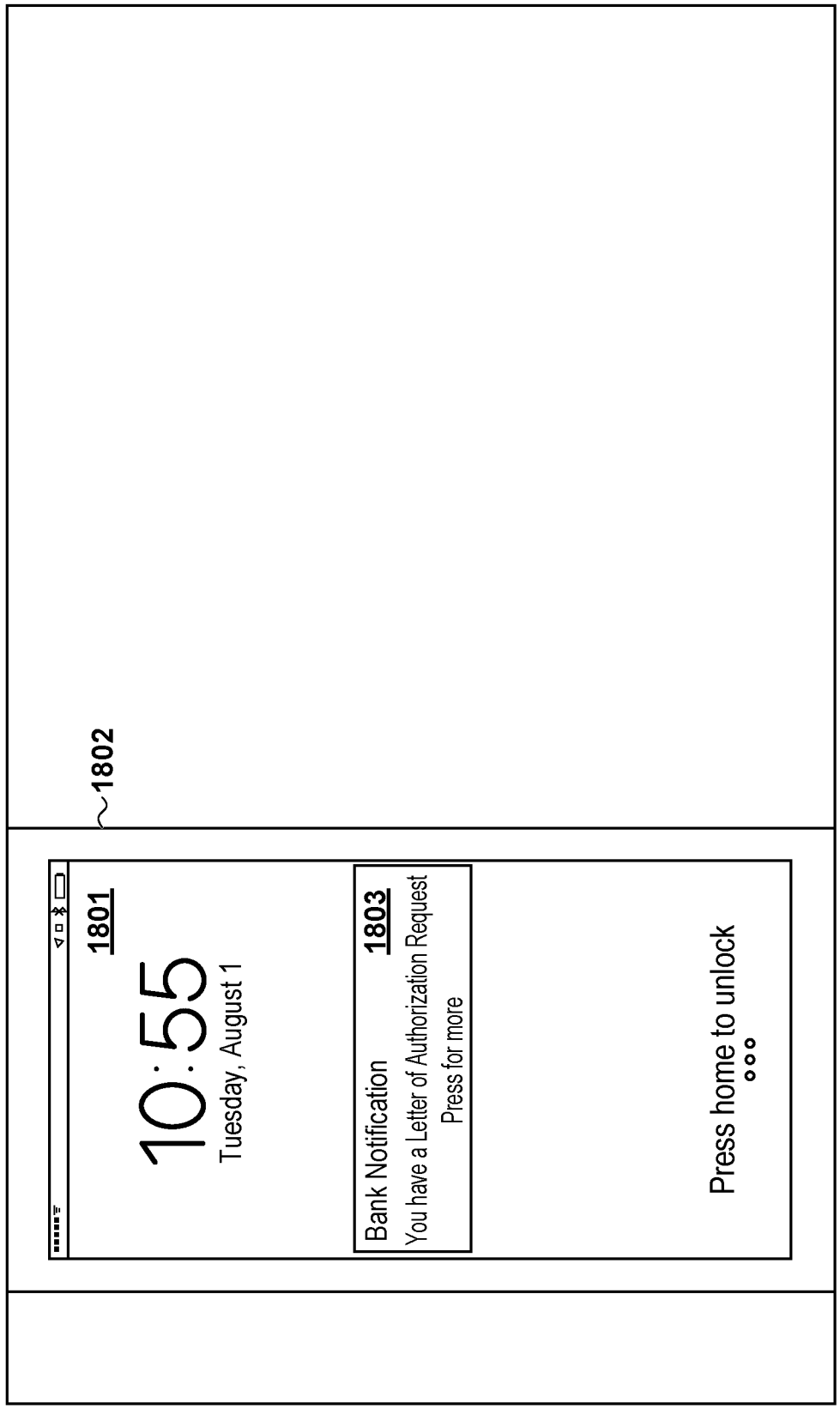
FIG. 18 is an illustration showing an alternate example of a letter of authorization processed through a platform for generating authenticated data objects.

Referring to FIG. 18, in some embodiments, a mobile application 1801 may be provided. Upon receiving a request for a letter of authorization from a bank, the mobile application 1801 may produce a push notification 1803 to a user of a mobile device 1802 in some embodiments.

Figure 19:
FIG. 19 is an illustration showing an alternate example of a letter of authorization processed through a platform for generating authenticated data objects and displayed on a front end user mobile interface for a client.

Referring to FIG. 19, in some embodiments, a mobile application 1901 may be provided. Upon receiving a request for a letter of authorization from a bank, the mobile application 1901 may display a draft letter of authorization to a user of the mobile application for review in some embodiments. Further, the mobile application 1901 may be integrated with a bank's existing client mobile application 1902 in some embodiments.

Figure 20:
FIG. 20 is an illustration showing an alternate example of a letter of authorization processed through a platform for generating authenticated data objects and displayed on a front end user mobile interface for a client.

Referring to FIG. 20, in some embodiments, a mobile application 2001 may be provided. Upon receiving a request for a letter of authorization from a bank, the mobile application 2001 may display the text of the letter of authorization to a user of a mobile device for review in some embodiments. Further, the mobile application 2001 may be integrated with a bank's existing client mobile application 2002 in some embodiments.

In some embodiments, a system is provided in which a client uses his or her private key to unlock the use of his or her private information and initiates a sign up transaction. An Application Form object is populated with the already verified information on a blockchain and the client may input or change any additional information through an electronic device (e.g., a phone). The filled out application may then be stored on an Application Registry, awaiting approval.

When a form is created, the employee or employees needed to approve a certain application may be specified. For example, this process may be a "Consecutive Approval Chain" (i.e., the employees must approve when it's their turn on the line) or a "Simultaneous Approval Chain" (i.e., the order of approval by employees does not matter). A Consecutive Approval Chain may be implemented by requiring the specific sequence of verification to be represented during the step of transforming the data object and one or more digital signatures into a locked data object. The signatures may be appended to the information data sets prior to a subsequent signing of the data object by the one or more computing systems.

Figure 21:
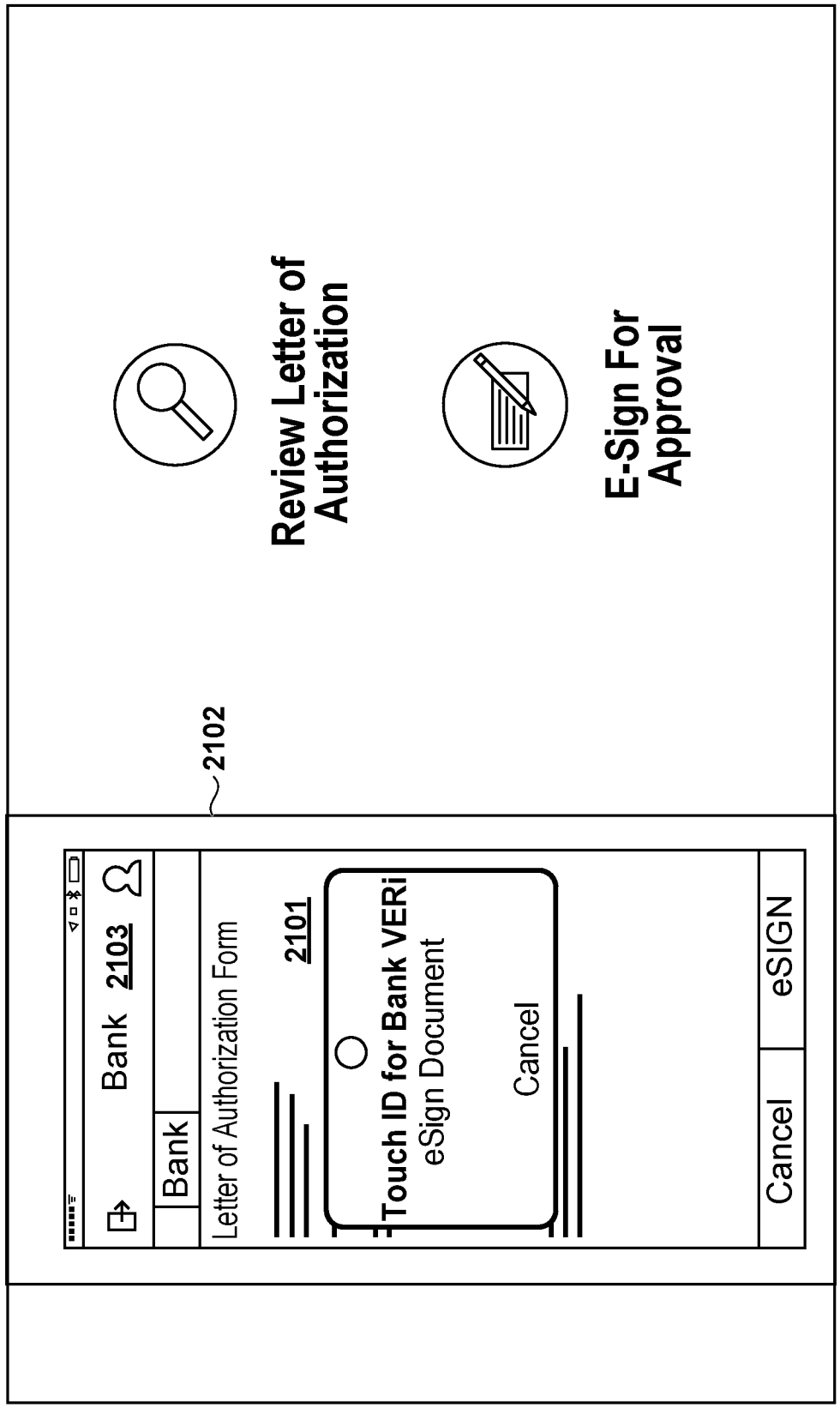
FIG. 21 is an illustration showing an alternate example of a letter of authorization processed through a platform for generating authenticated data objects and displayed on a front end user mobile interface for a client.

Referring to FIG. 21, in some embodiments, a mobile application 2101 may be provided. Upon receiving a request for a letter of authorization from a bank, the mobile application 2101 may display the text of the letter of authorization to a user of a mobile device 2102 for review in some embodiments. Further, the mobile application 2101 may be integrated with a bank's existing client mobile application 2103 in some embodiments. In some embodiments, a client may e-sign the letter of authorization for approval, e.g., by using Touch ID™ or another security protocol.

The approvers may, for example, be a Branch Manager and an Approving Authority. Approving employees may either approve or reject the application and add any additional comments they may have. Thus, the system is configured to avoid the KYC/AML process that can take up to 2 weeks as the employees know that the client information has been verified beforehand. Once the application is approved by all required approvers, in the appropriate sequence, if applicable, the application status may be changed to "Complete" and a smart contract may be triggered. The smart contract performs the administrative tasks of, for example, opening an account, and reconciles the Client ID with the completed application if there was any additional information provided or changed.

FIG. 22 is an example method diagram illustrating an example method for generating a locked data object, according to some embodiments.

The method can include different, alternate, or varied steps, and is shown as a non-limiting example of an embodiment. The method 2200 is a computer implemented method for provisioning a locked authentication data object, and is conducted by system 100, which includes one or more processors operating in conjunction with computer memory to implement a data package receiver, a blockchain interface mechanism, a state transition processor, reference databases, verification receivers, among others, which, in some embodiments are provided as a specific, special purpose machine encapsulated as a computer server that interconnects to a computing backend (e.g., at a data center for a financial institution).

The method includes first at 2202, registering a data object encapsulating information data sets associated with an individual onto a cryptographically secured chain of data blocks on a distributed ledger such that the data package is only accessible with a client private key associated with the individual. The data set is used to initialize a first data block on a chain representing the data set as a data object, and the information data set or representations thereof of the information data set.

At 2204, the data object is routed to one or more computing systems associated with one or more trusted individuals, each trusted individual being associated with a trusted individual private key (e.g., corresponding to a public key stored on reference public key database 124). The data object is verified by the trusted individual or entity.

Upon verification of the information data sets at 2206 by each of the one or more trusted individuals, the system 100 receives, from each computing system of the one or more computing systems, a corresponding digital signature associated with the corresponding trusted individual. This digital signature is used to transform the data object stored on the blockchain by initiating a state transition, which is represented through the insertion of a new block onto the end of the blockchain structure associated with the data object to append the digital signature (and/or any additional messages strings) at 2208.

The data object is maintained in a set of distributed ledger data structures housed on one or more distributed computing nodes synchronized in accordance with a consensus mechanism, the set of distributed ledger data structures including a series of cryptographically linked data blocks, the data blocks storing the data object both in one or more transformed states and in an initial untransformed state.

The consensus mechanism for propagating the blocks then receives an update message from the corresponding computing node, and the update message is propagated across all of the computing nodes such that distributed ledgers are synchronized (this may occur, for example, on a periodic basis).

State transitions occur based on an initial set of state transition information pre-defined either at the consensus mechanism or in the header/metadata information provided in the initial provisioning of the data object.

For example, the data object can include one or more state transition data fields which represent state transition conditions, the state transition conditions including logical operators which enable the transformation of the data object if the state transition conditions are met through corresponding operations on the data object. In an alternate embodiment, the state transition conditions are incorporated into the consensus mechanism, and wherein each of the one or more distributed computing nodes is configured to reject the one or more update messages if the state transition conditions are not met by the one or more update messages.

The one or more update messages and corresponding digital signatures are compared against a database of public keys associated with trustworthy entities to validate an identity of the trustworthy entity to which the corresponding digital signatures are indicated to relate to.

Upon receipt of all the required signatures and the corresponding set of state transitions, the data object at 2210 is transformed along with the one or more digital signatures into a locked data object. There may be a specific order of state transformations, or specific types (e.g., combined keys being used for synchronized signing, among others).

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems, and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer-implemented method for provisioning a locked data block, the method comprising:
   registering a data object encapsulating information data sets associated with a client individual onto a cryptographically secured chain of data blocks on a distributed ledger such that the data object is only accessible with a client private key associated with the client individual;
   routing the data object to one or more computing systems associated with one or more trusted individuals, each trusted individual being associated with a trusted individual private key;
   upon verification of the information data sets by each of the one or more trusted individuals, receiving, from each computing system of the one or more computing systems, a corresponding digital signature associated with the corresponding trusted individual;
   appending the digital signatures of the one or more trusted individuals to the data object; and
   appending a final block to the data object;
   wherein a mechanism that appends the final block uses an unknown private key, said final block transforming the data object and the digital signatures into the locked data block incapable of linkage with further data blocks on the distributed ledger.

2. The method of claim 1, wherein the data object is maintained in the distributed ledger and housed on one or more distributed computing nodes synchronized in accordance with a consensus mechanism, the cryptographically secured chain of data blocks on the distributed ledger storing the data object both in one or more transformed states, the final block, and in an initial untransformed state.

3. The method of claim 2, wherein each of the one or more distributed computing nodes is configured to receive one or more update messages including transition instructions to transition the data object to a next transformed state of the one or more transformed states, the next transformed state of the data object incorporating a digital signature derived at least based on data stored within the data object.

4. The method of claim 3, wherein the data object includes one or more state transition data fields which represent state transition conditions, the state transition conditions including logical operators which enable transformation of the data object if the state transition conditions are met through corresponding operations on the data object.

5. The method of claim 4, wherein the state transition conditions are incorporated into the consensus mechanism, and wherein each of the one or more distributed computing nodes is configured to reject the one or more update messages if the state transition conditions are not met by the one or more update messages.

6. The method of claim 4, wherein the state transition conditions are incorporated into the data object upon initialization in the initial untransformed state, and wherein each of the one or more distributed computing nodes is configured to parse the data object to retrieve the state transition conditions and reject the one or more update messages if the state transition conditions are not met by the one or more update messages.

7. The method of claim 4, wherein the one or more update messages and corresponding digital signatures are compared against a database of public keys associated with the one or more trusted individuals to validate an identity of the corresponding trusted individual to which the corresponding digital signatures are indicated to relate to.

8. The method of claim 7, wherein the state transition conditions include at least a specific order of transformations of the data object based on a specific set of digital signatures associated with a specific set of the one or more trusted individuals.

9. The method of claim 7, wherein the state transition conditions include at least a combined digital signature derived from the trusted individual private keys of at least two trusted individuals combined together, the combined digital signature representing a simultaneous approval.

10. The method of claim 7, wherein the one or more transformed states includes at least the appending of the final block, wherein the data object is modified through a final update message that appends a new data block onto the cryptographically secured chain of data blocks on the distributed ledger, and wherein the consensus mechanism is configured to reject any further data blocks for linkage to the final block.

11. A computer-implemented system for provisioning a locked data block, the system comprising:
    one or more computer processors operating in conjunction with a computer memory and non-transitory computer readable media, the one or more processors configured to:
      register a data object encapsulating information data sets associated with a client individual onto a cryptographically secured chain of data blocks on a distributed ledger such that the data object is only accessible with a client private key associated with the client individual;
      host the distributed ledger configured to route the data object to one or more computing systems associated with one or more trusted individuals, each trusted individual being associated with a trusted individual private key;
      upon verification of the information data sets by each of the one or more trusted individuals, receive, from each computing system of the one or more computing systems, a corresponding digital signature associated with the corresponding trusted individual;
      append the corresponding digital signatures of the one or more trusted individuals to the data object; and
      append a final block to the data object;
      wherein a mechanism that appends the final block uses an unknown private key, said final block transforming the data object and the one or more digital signatures into the locked data block incapable of linkage with further data blocks on the distributed ledger.

12. The system of claim 11, wherein the data object is maintained in the distributed ledger and housed on one or more distributed computing nodes synchronized in accordance with a consensus mechanism, the cryptographically secured chain of data blocks on the distributed ledger storing the data object both in one or more transformed states, the final block, and in an initial untransformed state.

13. The system of claim 12, wherein each of the one or more distributed computing nodes is configured to receive one or more update messages including transition instructions to transition the data object to a next transformed state of the one or more transformed states, the next transformed state of the data object incorporating a digital signature derived at least based on data stored within the data object.

14. The system of claim 13, wherein the data object includes one or more state transition data fields which represent state transition conditions, the state transition conditions including logical operators which enable transformation of the data object if the state transition conditions are met through corresponding operations on the data object.

15. The system of claim 14, wherein the state transition conditions are incorporated into the consensus mechanism, and wherein each of the one or more distributed computing nodes is configured to reject the one or more update messages if the state transition conditions are not met by the one or more update messages.

16. The system of claim 14, wherein the state transition conditions are incorporated into the data object upon initialization in the initial untransformed state, and wherein each of the one or more distributed computing nodes is configured to parse the data object to retrieve the state transition conditions and reject the one or more update messages if the state transition conditions are not met by the one or more update messages.

17. The system of claim 14, wherein the one or more update messages and corresponding digital signatures are compared against a database of public keys associated with the one or more trusted individuals to validate an identity of the corresponding trusted individual to which the corresponding digital signatures are indicated to relate to.

18. The system of claim 17, wherein the state transition conditions include at least a specific order of transformations of the data object based on a specific set of digital signatures associated with a specific set of the one or more trusted individuals.

19. The system of claim 17, wherein the one or more transformed states includes at least the appending of the final block, wherein the data object is modified through a final update message that appends a new data block onto the series of cryptographically secured chain of data blocks on the distributed ledger, and wherein the consensus mechanism is configured to reject any further data blocks for linkage to the final block.

20. A non-transitory computer-readable medium storing machine-interpretable instructions for provisioning a locked data block, the machine-interpretable instructions, which when executed by a processor, perform steps of a method comprising:
  registering a data object encapsulating information data sets associated with a client individual onto a cryptographically secured chain of data blocks on a distributed ledger such that the data object is only accessible with a client private key associated with the client individual;
  routing the data object to one or more computing systems associated with one or more trusted individuals, each trusted individual being associated with a trusted individual private key;
  upon verification of the information data sets by each of the one or more trusted individuals, receiving, from each computing system of the one or more computing systems, a corresponding digital signature associated with the corresponding trusted individual;
  appending the one or more digital signatures of the one or more trusted individuals to the data object; and
  appending a final block to the data object;
  wherein a mechanism that appends the final block uses an unknown private key, said final block transforming the data object and the one or more digital signatures into the locked data block incapable of linkage with further data blocks on the distributed ledger.

* * * * *